(12) United States Patent
Matsuda et al.

(10) Patent No.: US 8,751,969 B2
(45) Date of Patent: Jun. 10, 2014

(54) INFORMATION PROCESSOR, PROCESSING METHOD AND PROGRAM FOR DISPLAYING A VIRTUAL IMAGE

(75) Inventors: Kouichi Matsuda, Tokyo (JP); Masaki Fukuchi, Tokyo (JP)

(73) Assignee: Sony Corporation, Tokyo (JP)

( * ) Notice: Subject to any disclaimer, the term of this patent is extended or adjusted under 35 U.S.C. 154(b) by 207 days.

(21) Appl. No.: 13/383,511

(22) PCT Filed: Jun. 30, 2010

(86) PCT No.: PCT/JP2010/061161
§ 371 (c)(1),
(2), (4) Date: Jan. 11, 2012

(87) PCT Pub. No.: WO2011/010533
PCT Pub. Date: Jan. 27, 2011

(65) Prior Publication Data
US 2012/0124509 A1    May 17, 2012

(30) Foreign Application Priority Data
Jul. 21, 2009 (JP) ................................. 2009-170118

(51) Int. Cl.
*G06F 3/00* (2006.01)
(52) U.S. Cl.
USPC ........... 715/856; 715/857; 715/858; 715/859; 715/860; 715/861; 715/862; 345/7; 345/8; 345/9
(58) Field of Classification Search
USPC .................... 715/856–862; 345/7–9
See application file for complete search history.

(56) References Cited

U.S. PATENT DOCUMENTS

| 5,305,435 A * | 4/1994 | Bronson ................. 715/777 |
| 6,297,804 B1 * | 10/2001 | Kashitani .............. 345/157 |
| 7,103,841 B2 * | 9/2006 | Ronkainen et al. ...... 715/727 |
| 8,176,434 B2 * | 5/2012 | Saul et al. ............ 715/784 |
| 8,310,445 B2 * | 11/2012 | Sato .................... 345/157 |
| 2007/0052672 A1 * | 3/2007 | Ritter et al. ............ 345/156 |
| 2009/0221368 A1 * | 9/2009 | Yen et al. ................. 463/32 |
| 2009/0237564 A1 * | 9/2009 | Kikinis et al. ............ 348/584 |
| 2010/0164990 A1 * | 7/2010 | Van Doorn ................ 345/633 |
| 2010/0265175 A1 | 10/2010 | Kabasawa et al. |
| 2011/0167379 A1 * | 7/2011 | Robertson et al. ........ 715/782 |
| 2012/0329558 A1 * | 12/2012 | Haigh-Hutchinson ..... 463/32 |

FOREIGN PATENT DOCUMENTS

| JP | 2000-56896 | 2/2000 |
| JP | 2006-154902 | 6/2006 |
| JP | 2008-304268 | 12/2008 |

(Continued)

*Primary Examiner* — Kieu Vu
*Assistant Examiner* — Andrew Chung
(74) *Attorney, Agent, or Firm* — Finnegan, Henderson, Farabow, Garrett & Dunner, LLP

(57) ABSTRACT

The present invention provides a configuration that allows for a cursor or other object that has moved outside the display section to be displayed as a virtual object and observed. A cursor or object lying in an area outside the area of the display section of a PC or other device is displayed as a virtual object. For example, the display of goggles worn by the user displays a display device such as a PC and the area outside the display device. The three-dimensional position of the cursor or object that has probably moved in response to user operation is calculated, after which the cursor or object is displayed as a virtual object at the calculated position. Further, object information for the object specified by the cursor is acquired and presented.

8 Claims, 14 Drawing Sheets

(56) References Cited

FOREIGN PATENT DOCUMENTS

| | | |
|---|---|---|
| JP | 2008-304269 | 12/2008 |
| JP | 2008304268 * | 12/2008 |
| JP | WO2009072504 * | 6/2009 |
| WO | WO 2009/072504 A1 | 6/2009 |

\* cited by examiner

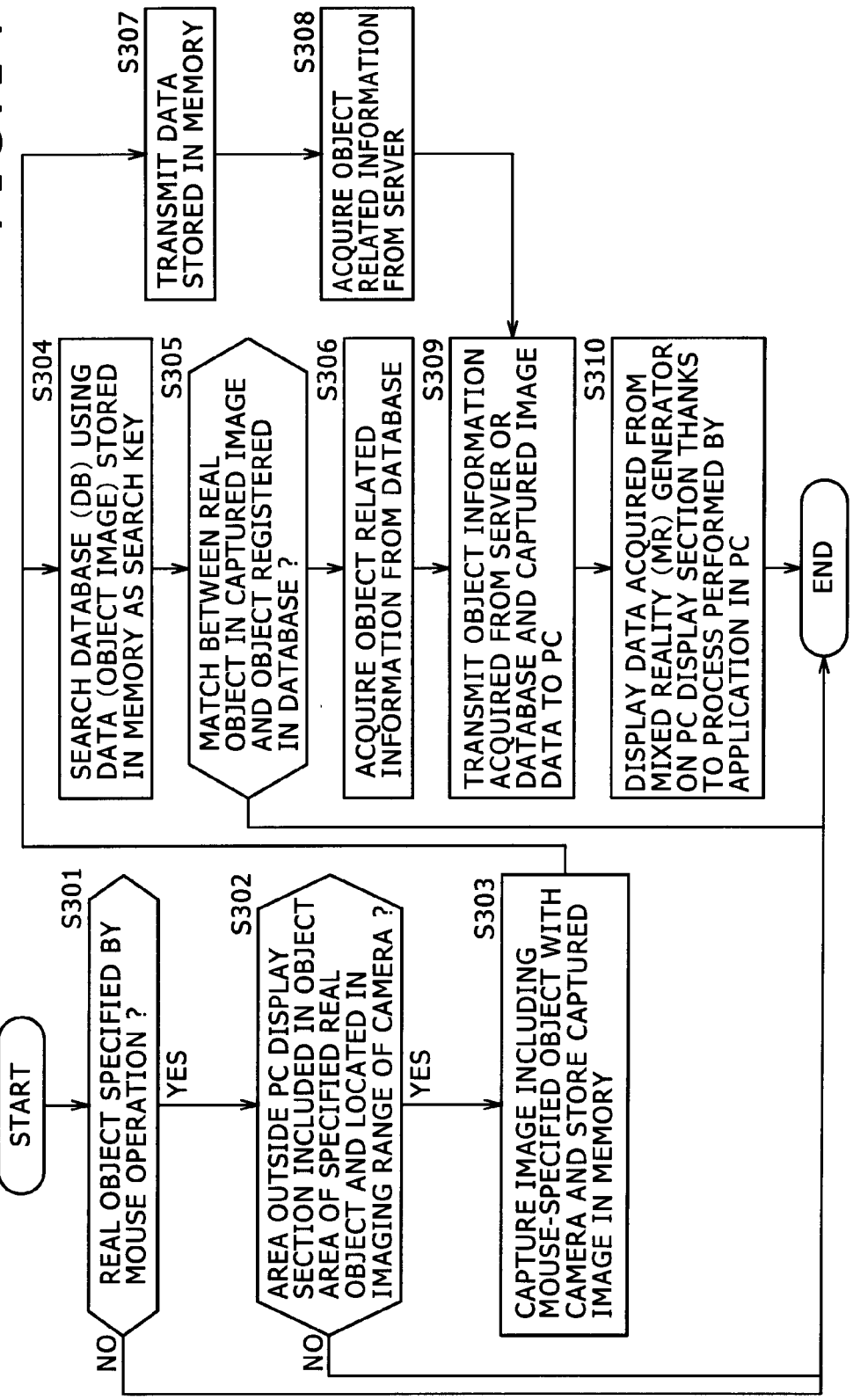

US 8,751,969 B2

INFORMATION PROCESSOR, PROCESSING METHOD AND PROGRAM FOR DISPLAYING A VIRTUAL IMAGE

TECHNICAL FIELD

The present invention relates to an information processor, processing method and program. The present invention relates more specifically to an information processor, processing method and program for processing data using a mixed reality (MR) technique that merges real-world real objects and electronic display.

BACKGROUND ART

For example, if the user processes data using a PC (Personal Computer), he or she processes the display data on the display section (display) of the PC. However, processing the data only on the display section, i.e., a limited area, involves the following problem.

(1) When operated with a mouse, the mouse cursor appearing on the display section of a PC or other device stops at the edge of the screen area of the display section. This makes it impossible to move an object or window in the display area to an area outside the screen area of the display section using the mouse cursor.

(2) If windows and other objects used by the user fill up the screen area of the display section of a PC or other device, many windows are displayed to overlap each other. In order to view an underlying window, the user must, for example, select the underlying window to display it on top or change the overlapping windows into icons. However, the former process makes it impossible to view the windows that have been moved behind other windows. On the other hand, the latter process makes it impossible to view the details of the iconized windows.

There are the above problems. It should be noted that the following process can be performed to use an area larger than the size of the display section of a PC or other device.
(a) Have ready a new physical display and connect the display to the computer operated by the user so that a plurality of displays are available for use.
(b) Set up a virtual desktop on the single display section.

However, the former (a) requires not only a cost of adding a display but also a space. On the other hand, the latter (b) requires the user to enter a command or manipulate an icon appearing, for example, on the tray to access an area other than that which is actually displayed on the display section.

The present invention is intended to solve these problems by using, for example, mixed reality (MR)-based data processing. It should be noted that Patent Document 1 (Japanese Patent Laid-Open No. 2008-304268) and Patent Document 2 (Japanese Patent Laid-Open No. 2008-304269) are examples of the prior art describing mixed reality. These documents describe the process adapted to prepare a three-dimensional map of the real world using images captured by a camera.

PRIOR ART DOCUMENTS

Patent Documents

Patent Document 1: Japanese Patent Laid-Open No. 2008-304268
Patent Document 2: Japanese Patent Laid-Open No. 2008-304269

DISCLOSURE OF INVENTION

Technical Problem

It is an object of the present invention to provide an information processor, information processing method and program that effectively use a space area other than the display section (display) of a PC or other device rather than only inside the display section for data processing thanks to mixed reality (MR)-based data processing.

Technical Solution

A first mode of the present invention is an information processor including a coordinate processing module, camera, three-dimensional information analysis section, second display section and virtual object management section. The coordinate processing module determines whether the position of a cursor, i.e., a position indicator displayed on a first display section, is located in or outside the area of the first display section and outputs cursor position information to the virtual object management section if the cursor is located outside the area of the first display section. The camera captures an image of a real object including the first display section. The three-dimensional information analysis section analyzes the three-dimensional position of the real object included in a camera-captured image. The second display section displays the camera-captured image. The virtual object management section generates a virtual object different from the real object included in the camera-captured image and generates a composite image including the generated virtual object and the real object so as to display the composite image on the second display section. The virtual object management section calculates the three-dimensional position of the cursor based on the cursor position information supplied from the coordinate processing module so as to display, on the second display section, a composite image in which the object is placed at the calculated position as a virtual object.

Further, in an embodiment of the information processor according to the present invention, the information processor includes an application execution section adapted to process a specified object specified by the position indicator. The application execution section determines whether the specified object is located in or outside the area of the first display section and outputs object position information to the virtual object management section if the specified object is located outside the area of the first display section. The virtual object management section calculates the three-dimensional position of the object based on the object position information supplied from the coordinate processing module so as to display, on the second display section, a composite image in which the object is placed at the calculated position as a virtual object.

Further, in another embodiment of the information processor according to the present invention, if the three-dimensional position of the object calculated based on the object position information supplied from the coordinate processing module includes the display area of the first display section, the virtual object management section displays, on the second display section, a composite image with an object area image overlapping the display area of the first display section deleted.

Further, in still another embodiment of the information processor according to the present invention, the information processor further includes an object information acquisition section. The object information acquisition section acquires image data of a real object specified by the cursor placed as the virtual object and searches data based on the acquired image data so as to acquire object information. The object information acquisition section outputs the acquired object information to the first display section as display data.

Further, in still another embodiment of the information processor according to the present invention, the object information acquisition section accesses a database in which real object image data and object information are associated with each other or a server so as to acquire object information through a search based on the real object image data.

Further, in still another embodiment of the information processor according to the present invention, the virtual object management section calculates a plane including the display surface of the first display section based on three-dimensional position information of components making up the first display section included in the camera-captured image and calculates the three-dimensional position of the cursor so that the cursor position is placed on the plane.

Further, in still another embodiment of the information processor according to the present invention, the cursor is a mouse cursor that moves by mouse operation. The coordinate processing module receives mouse cursor displacement information resulting from the mouse operation and determines whether the mouse cursor is located in or outside the area of the first display section.

Further, a second mode of the present invention is an information processing method performed by an information processor. The information processing method includes a coordinate processing step of a coordinate processing module determining whether the position of a cursor, i.e., a position indicator displayed on a first display section, is located in or outside the area of the first display section and outputting cursor position information to a virtual object management section if the cursor is located outside the area of the first display section. The information processing method further includes an image capture step of a camera capturing an image of a real object including the first display section. The information processing method further includes a three-dimensional information analysis step of a three-dimensional information analysis section analyzing the three-dimensional position of the real object included in a camera-captured image. The information processing method further includes a virtual object management step of a virtual object management section generating a virtual object different from the real object included in the camera-captured image and generating a composite image including the generated virtual object and the real object so as to display the composite image on the second display section.

The virtual object management step is a step of calculating the three-dimensional position of a cursor based on cursor position information supplied from the coordinate processing module so as to display, on the second display section, a composite image in which the cursor is placed at the calculated position as a virtual object.

Further, a third mode of the present invention is a program causing an information processor to process information. The program includes a coordinate processing step of causing a coordinate processing module to determine whether the position of a cursor, i.e., a position indicator displayed on a first display section, is located in or outside the area of the first display section and output cursor position information to a virtual object management section if the cursor is located outside the area of the first display section. The program further includes an image capture step of causing a camera to capture an image of a real object including the first display section. The program still further includes a three-dimensional information analysis step of causing a three-dimensional information analysis section to analyze the three-dimensional position of the real object included in a camera-captured image. The program still further includes a virtual object management step of causing a virtual object management section to generate a virtual object different from the real object included in the camera-captured image and generate a composite image including the generated virtual object and the real object so as to display the composite image on the second display section.

The virtual object management step is a step of causing the virtual object management section to calculate the three-dimensional position of a cursor based on cursor position information supplied from the coordinate processing module so as to display, on the second display section, a composite image in which the cursor is placed at the calculated position as a virtual object.

It should be noted that the program according to the present invention can be supplied, for example, via a recording or communication media adapted to supply, in a computer-readable form, a program to an image processor or computer system adapted to execute a variety of program codes. If such a program is supplied in a computer-readable form, the processes appropriate to the program are implemented in the image processor or computer system.

Other objects, features and advantages of the present invention will be apparent from a detailed description based on the embodiments which will be described later and the accompanying drawings. It should be noted that the term "system" in the present specification refers to a logical collection of a plurality of devices, and that the constituent devices are not necessarily provided in the same enclosure.

Advantageous Effect

In a configuration according to an embodiment of the present invention, a cursor or object lying in an area outside the area of the display section of a PC or other device is displayed as a virtual object. For example, the display of goggles worn by the user displays a display device such as a PC and the area outside the display device. The three-dimensional position of the cursor or object that has probably moved in response to user operation is calculated, after which the cursor or object is displayed as a virtual object at the calculated position. Further, object information for the object specified by the cursor is acquired and presented. The present configuration makes it possible to constantly observe and verify data that has moved outside the display section, thus providing improved data processing efficiency.

BRIEF DESCRIPTION OF DRAWINGS

FIG. 14 is a diagram illustrating a flowchart that describes a process sequence performed by the information processor according to the present invention.

MODE FOR CARRYING OUT THE INVENTION

A detailed description will be given below of the information processor, processing method and program according to the present invention with reference to the accompanying drawings.

The present invention will be described with respect to the following items in sequence:
1. Outline of the processes performed by the information processor according to the present invention
2. Configuration of and processes performed in accordance with a first embodiment of the information processor according to a first embodiment of the present invention
3. Configuration of and processes performed by the information processor according to a second embodiment of the present invention
4. Configuration of and processes performed by the information processor according to a third embodiment of the present invention
[1. Outline of the Processes Performed by the Information Processor According to the Present Invention]

A description will be given first of the outline of processes performed by the information processor according to the present invention with reference to FIGS. 1 to 3. The present invention is designed to effectively use a space area other than the display section (display) of a PC or other device for data processing thanks to mixed reality (MR)-based data processing.

Figure 1:
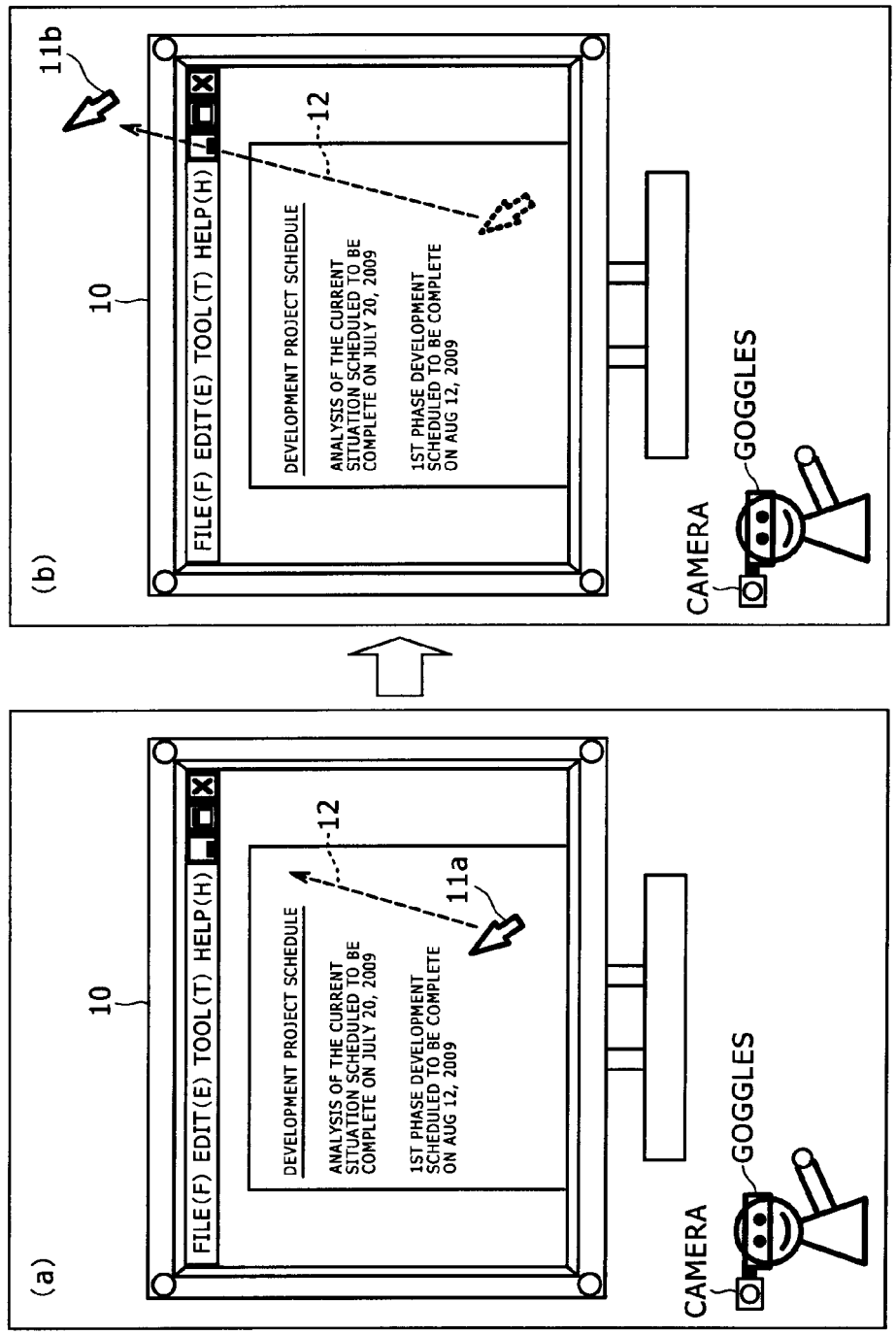
FIG. 1 is a set of diagrams illustrating an example of a process performed by an information processor according to the present invention.

FIG. 1 is a set of diagrams illustrating an example of a process performed by the information processor according to the present invention. FIG. 1 shows a display section 10 of a PC or other device operated by the user. It should be noted that although a detailed configuration will be described later, the user is operating the PC with goggles on. The goggles have a display adapted to display an image generated by a mixed reality (MR) generator.

The goggles have a camera adapted to capture an image of the surrounding environment. The display of the goggles displays a composite image composed of the camera-captured image and a virtual object generated by the mixed reality (MR) generator. Each of FIGS. 1(*a*) and (*b*) shows an image appearing on the display of the goggles worn by the user for observation.

The user is preparing a document by displaying the document on the display section 10 as illustrated, for example, in FIG. 1(*a*). This process is an ordinary PC operation. The display section 10 illustrated in FIG. 1(*a*) displays a mouse cursor 11*a* as a position indicator adapted to move in response to the movement of the mouse operated by the user.

The user can move the mouse cursor 11*a* by operating the mouse. In a conventional information processor, the mouse cursor moves within the display area of the display section 10. However, when the present invention is applied, the movement of the mouse cursor is not limited to within the display area of the display section 10.

For example, if moved along a movement line 12 shown in FIG. 1(*a*) by user operation, the mouse cursor can be moved to a space outside the display section 10 as shown in FIG. 1(*b*). This is a mouse cursor 11*b* shown in FIG. 1(*b*). The mouse cursor 11*b* shown in FIG. 1(*b*) is a virtual object generated by the mixed reality (MR) generator. The user observes the mouse cursor 11*b* which is a virtual object displayed on the display of the goggles worn by the user. As described above, the configuration according to the present invention allows for the mouse cursor 11 to be moved at will inside or outside the display section 10.

Figure 2:
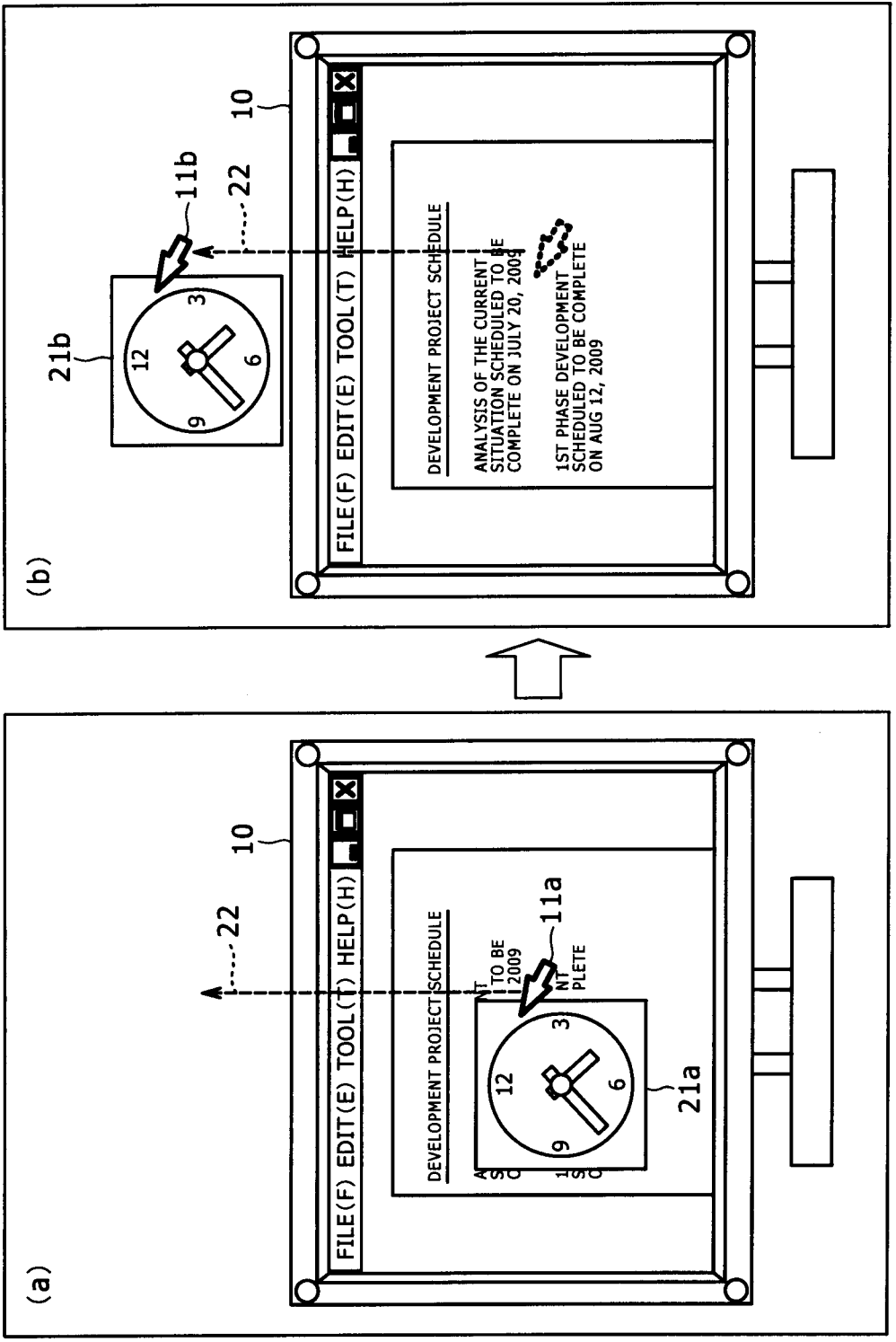
FIG. 2 is a set of diagrams illustrating an example of a process performed by the information processor according to the present invention.

FIG. 2 is also a set of diagrams illustrating an example of a process performed by the information processor according to the present invention. As with FIG. 1, FIG. 2 also shows the display section 10 of a PC or other device operated by the user. The user is wearing goggles having a display adapted to display an image generated by a mixed reality (MR) generator. Each of FIGS. 2(*a*) and 2(*b*) shows an image appearing on the display of the goggles worn by the user for observation.

The display section 10 shown in FIG. 2(*a*) displays the mouse cursor 11*a* and an object 21*a* specified by the mouse cursor 11*a*. In this example, the object 21*a* is an object displayed on the display section 10 as a result of the execution of a clock display application in the PC.

The user moves the mouse cursor 11*a* onto the object 21*a* by operating the mouse, specifies the object by operating the mouse and further moves the mouse cursor 11*a* along a movement line 22 shown in FIG. 2(*a*).

This process allows for the mouse cursor and specified object 21 to be moved to a space outside the display section 10. The object 21 is an object 21*b* shown in FIG. 2(*b*). The object 21*b* shown in FIG. 2(*b*) is a virtual object generated by the mixed reality (MR) generator. The user observes the object 21*b* displayed on the display of the goggles worn by the user. As described above, the configuration according to the present invention allows for not only the mouse cursor but also an object displayed on the display section 10 to be moved at will.

Figure 3:
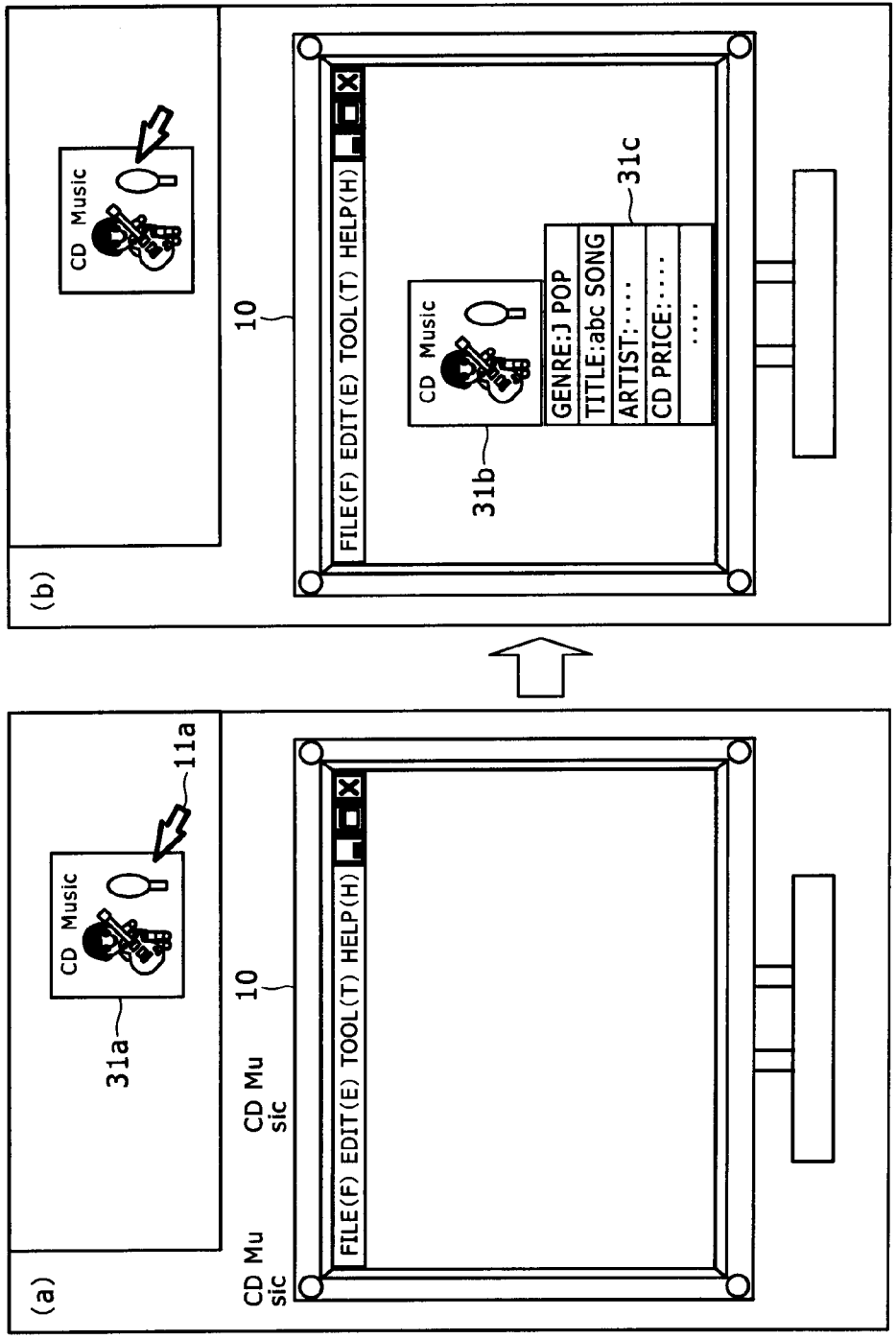
FIG. 3 is a set of diagrams illustrating an example of a process performed by the information processor according to the present invention.

FIG. 3 is also a set of diagrams illustrating an example of a process performed by the information processor according to the present invention. As with FIG. 1 and FIG. 2, FIG. 3 also shows the display section 10 of a PC or other device operated by the user. The user is wearing goggles having a display adapted to display an image generated by a mixed reality (MR) generator. Each of FIGS. 3(*a*) and 3(*b*) shows an image appearing on the display of the goggles worn by the user for observation.

FIG. 3(*a*) shows the mouse cursor 11*a* placed outside the display section 10 by the operation described earlier with reference to FIG. 1 and a real object 31*a* specified by the mouse cursor 11*a*. In this example, the object 31*a* is a real object actually existing in a space. In this example, the object 31*a* is a photograph of a CD jacket, i.e., a disk that stores music data.

The user places the mouse cursor 11*a* on the object 31*a* by mouse operation and specifies the object by mouse operation. Information about the specified object, i.e., object information, is acquired from a database or server by specifying the object. The acquired object information is displayed on the display section 10. An object image 31*b* and object information 31*c* shown in FIG. 3(*b*) are object information.

As described above, the configuration according to the present invention makes it possible to specify a variety of real objects in a real space with a mouse cursor, i.e., a virtual object, acquire information related to the specified object, load the acquired data into the information processor such as a PC for processing and display the acquired data on the display section 10 as a result of the execution of an application in the PC.

[2. Configuration of and Processes Performed by the Information Processor According to a First Embodiment of the Present Invention]

A detailed description will be given next of the configuration of and processes performed by the information processor adapted to perform the process described as a first embodiment of the present invention with reference to FIG. 1. As shown in FIG. 1, embodiment 1 is a configuration example in which the mouse cursor is moved to a space outside the display section 10 as illustrated in FIG. 1(*b*) by moving the mouse cursor 11*a* along the movement line 12 shown in FIG. 1(*a*) as a result of mouse operation by the user.

Figure 4:
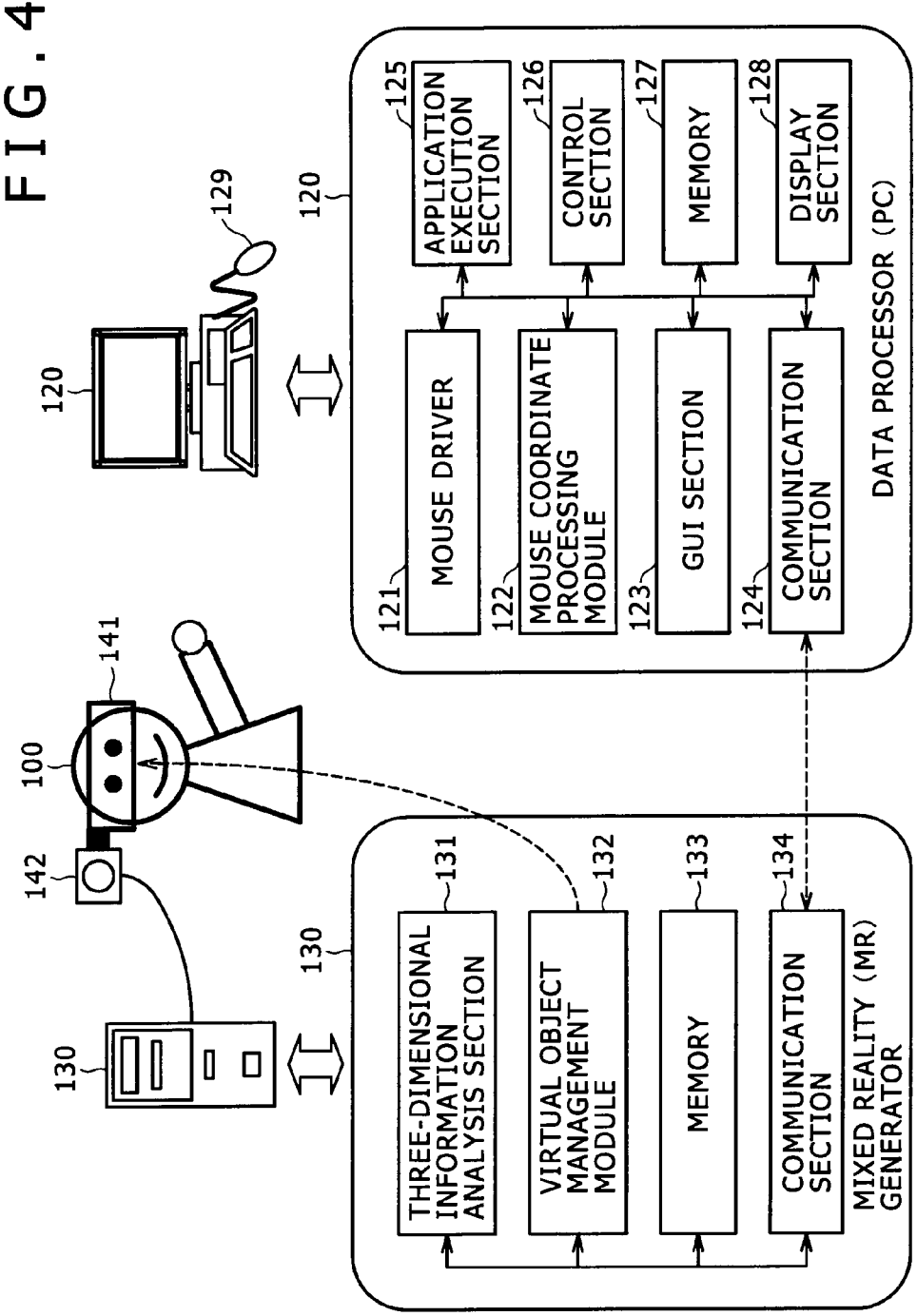
FIG. 4 is a diagram describing a configuration example of the information processor according to the present invention.

FIG. 4 is a diagram illustrating the configuration of the information processor according to an embodiment of the present invention adapted to perform the above process. A user 100 processes a variety of data by operating a PC (personal computer) 120. The PC 120 includes a mouse driver 121, mouse coordinate processing module 122, GUI section 123, communication section 124, application execution section 125, control section 126, memory 127 and display section 128 as illustrated in FIG. 4. The PC 120 further includes a mouse 129 illustrated at the top in FIG. 4.

The mouse driver 121 receives position information and operation information from the mouse 129 as input information. The mouse coordinate processing module 122 determines the display position of the mouse cursor according to the position information of the mouse 129 received via the mouse driver 121. It should be noted that the display position of the mouse cursor is not limited to the display area of the display section 128 in the configuration according to the present invention.

The GUI section 123 is a user interface adapted, for example, to process information received from the user and output information to the user. The communication section 124 communicates with a mixed reality (MR) generator 130.

The application execution section 125 executes an application appropriate to data processing performed by the PC 120. The control section 126 exercises control over the processes performed by the PC 120. The memory 127 includes RAM, ROM and other storage devices adapted to store, for example, programs and data processing parameters. The display section 128 is a display section which includes, for example, an LCD.

The user 100 wears goggles 141 having a display adapted to display virtual objects. The goggles have a camera 142 adapted to capture an image of the surrounding environment. The goggles 141 and camera 142 are connected to the mixed reality (MR) generator 130. The user 100 performs his or her tasks while observing an image appearing on the display provided on the goggles 141.

The display of the goggles 141 displays a real-world image, i.e., an image captured by the camera 142. The display of the goggles 141 further displays a virtual object, generated by the mixed reality (MR) generator 130, together with the real-world image.

In the example shown in FIG. 4, the user 100 is operating the PC (personal computer) 120, and the camera 142 is capturing an image of the PC (personal computer) 120 operated by the user 100. Therefore, the display of the goggles 141 displays, as a real-world image, an image including, for example, the display (display section 128) of the PC (personal computer) 120 operated by the user 100 and a variety of real objects around the display of the PC 120. Further, a virtual object, generated by the mixed reality (MR) generator 130, appears superimposed on the real-world image. The orientation of the camera 142 is changed according to the movement of the user 100.

Figure 5:
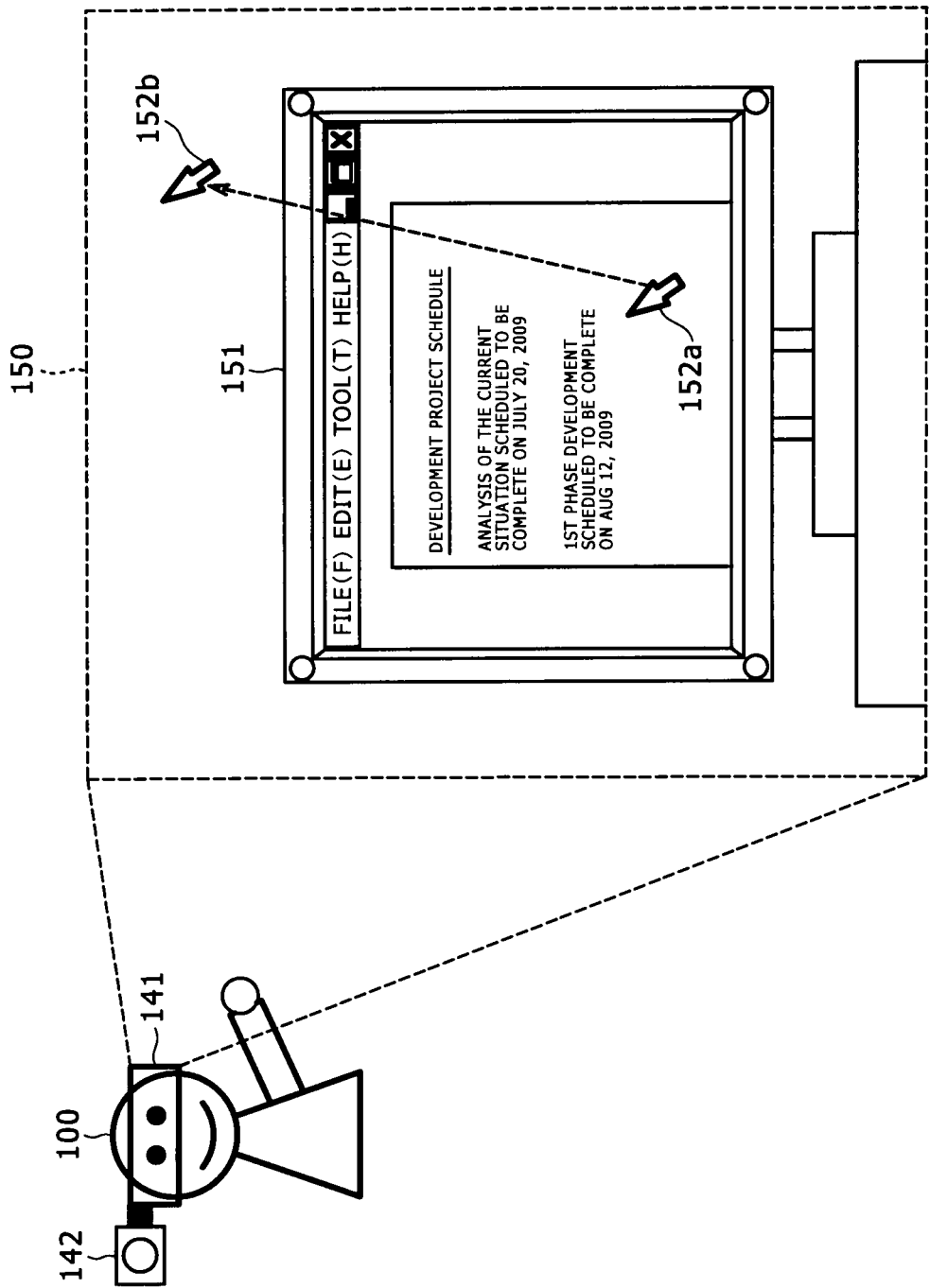
FIG. 5 is a diagram describing an example of display data displayed on a display of goggles worn by the user as a result of a process performed by the information processor according to the present invention.

If the user 100 faces the screen of the PC 120 while performing his or her tasks, the camera 142 captures an image centering around the image on the screen of the PC 120. As a result, display data 150 as illustrated, for example, in FIG. 5 appears on the display of the goggles 141 worn by the user 100. The display data 150 illustrated in FIG. 5 is a composite image including real and virtual objects.

A description will be given next of the configuration of the mixed reality (MR) generator 130 shown in FIG. 4. The mixed reality (MR) generator 130 includes a three-dimensional information analysis section 131, virtual object management module 132, memory 133 and communication section 134 as illustrated in FIG. 4.

The three-dimensional information analysis section 131 receives an image captured by the camera 142 worn by the user and analyzes the three-dimensional positions of the objects included in the captured image. This three-dimensional position analysis is performed, for example, using SLAM (simultaneous localization and mapping). SLAM is designed to select feature points from a variety of real objects included in the camera-captured image and detect the positions of the selected feature points and the position and posture of the camera. It should be noted that SLAM is described in Patent Document 1 (Japanese Patent Laid-Open No. 2008-304268) and Patent Document 2 (Japanese Patent Laid-Open No. 2008-304269) mentioned earlier. It should be noted that the basic process of SLAM is described in a paper titled [Andrew J. Davison, "Real-time simultaneous localisation and mapping with a single camera," Proceedings of the 9th International Conference on Computer Vision, Ninth, (2003)].

The three-dimensional information analysis section 131 calculates the three-dimensional positions of the real objects included in the image captured by the camera 142 worn by the user using, for example, SLAM described above. It should be noted, however, that the three-dimensional information analysis section 131 may find the three-dimensional positions of the real objects included in the camera-captured image by using a method other than SLAM described above.

The virtual object management module 132 manages the virtual objects appearing on the display of the goggles 141 worn by the user. The virtual objects are data stored in the memory 133. More specifically, the display of the goggles 141 worn by the user displays, for example, the display data 150 illustrated in FIG. 5. A PC image 151 included in the display data 150 is a real image (real object) captured by the camera 142.

For example, if the user moves the mouse 129 of the PC 120, a mouse cursor 152a appearing in the PC image 151 shown in FIG. 5 moves outside the PC image 151, thus displaying a mouse cursor 152b as a virtual object.

The user 100 shown in FIG. 4 can observe a composite image including, for example, the real and virtual objects shown in FIG. 5 on the display of the goggles 141. The PC image 151 shown in FIG. 5 is a real object captured by the camera 142. The mouse cursor 152a in the PC image 151 is also information, i.e., a real object, actually appearing in the PC image 151. It should be noted that an object that exists in a real world captured by the camera 142 and whose image can be captured by the camera is described here as a real object.

The mouse cursor 152b outside the PC image 151 shown in FIG. 5 is not a real-world object (real object). The mouse cursor 152b is a virtual object generated by the mixed reality (MR) generator 130. The mouse cursor 152b is an object that does not exist in a real world but appears on the display of the goggles 141 worn by the user.

A description will be given below of the process sequence adapted to display the mouse cursors as described above with reference to the flowchart shown in FIG. 6. It should be noted that we assume that the user is operating the mouse 129 connected to the PC 120 shown in FIG. 4. Operation information is supplied to the mouse driver. From this process onward, the process starting from step S101 in the flowchart shown in FIG. 6 is performed.

Figure 6:
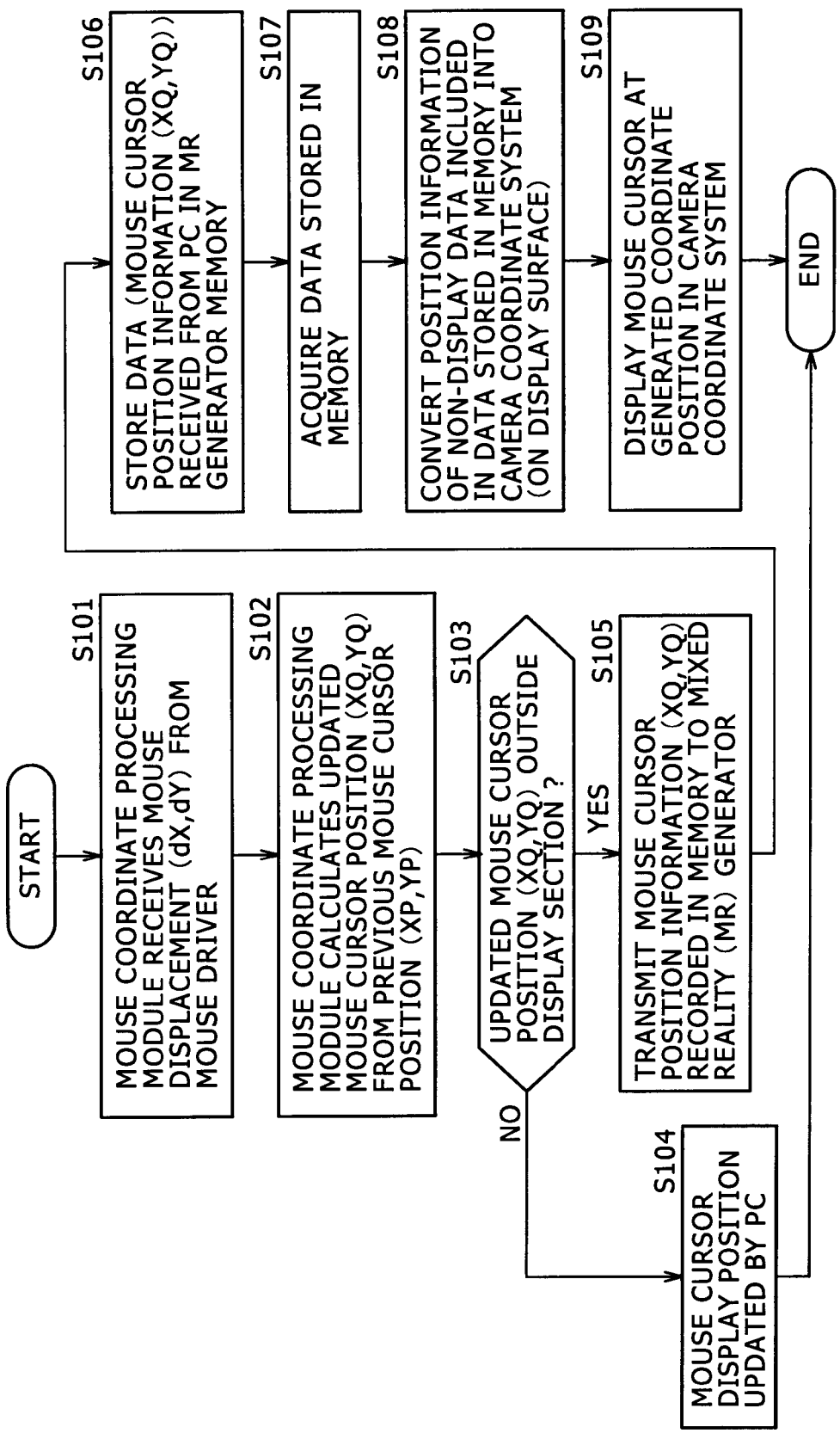
FIG. 6 is a diagram illustrating a flowchart that describes a process sequence performed by the information processor according to the present invention.

The process steps from step S101 to step S105 in the flowchart shown in FIG. 6 are performed by the PC 120 shown in FIG. 4.

The process steps from step S106 to step S109 are performed by the mixed reality (MR) generator 130 shown in FIG. 4.

In step S101, the mouse coordinate processing module 122 of the PC 120 receives mouse displacement (dX, dY) information from the mouse driver 121.

In step S102, the mouse coordinate processing module 122 calculates an updated mouse cursor position (XQ, YQ) from the previous mouse cursor position (XP, YP) and the mouse displacement (dX, dY) information.

In step S103, the mouse coordinate processing module 122 determines whether or not the updated mouse cursor position (XQ, YQ) is outside the display section. The process proceeds to step S104 when the updated mouse cursor position (XQ, YQ) is inside the area of the display section. In this case, the PC updates the display of the mouse cursor as is normally done. The process proceeds to step S105 if the updated mouse cursor position (XQ, YQ) is outside the area of the display section.

In step S105, the mouse cursor position information (XQ, YQ) stored in the memory is transferred to the mixed reality (MR) generator 130 via the communication section. It should be noted that, in the present embodiment, the position information transferred from the PC 120 to the mixed reality (MR) generator 130 is only position information of the mouse cursor and that the mixed reality (MR) generator 130 acknowledges in advance that the transferred position information is that of the mouse cursor. In order to transfer position information or other information of other objects, it is necessary to transfer identification information of each object or object drawing data.

The process steps from step S106 onward are performed by the mixed reality (MR) generator 130.

First, in step S106, the mixed reality (MR) generator 130 stores the mouse cursor position information (XQ, YQ) transferred from the PC 120 in its memory 133. If the mixed reality (MR) generator 130 receives non-display data (mouse cursor drawing data) or its identifier from the PC 120, the received data is also stored in the memory 133 of the mixed reality (MR) generator 130.

Next, in step S107, the virtual object management module 132 of the mixed reality (MR) generator 130 acquires the data stored in the memory 133, i.e., the non-display data (mouse cursor drawing data) and position information (XQ, YQ).

In step S108, the virtual object management module 132 converts the position information of the non-display data (mouse cursor) into the camera coordinate system for the camera-captured image acquired from the three-dimensional information analysis section 131.

Figure 7:
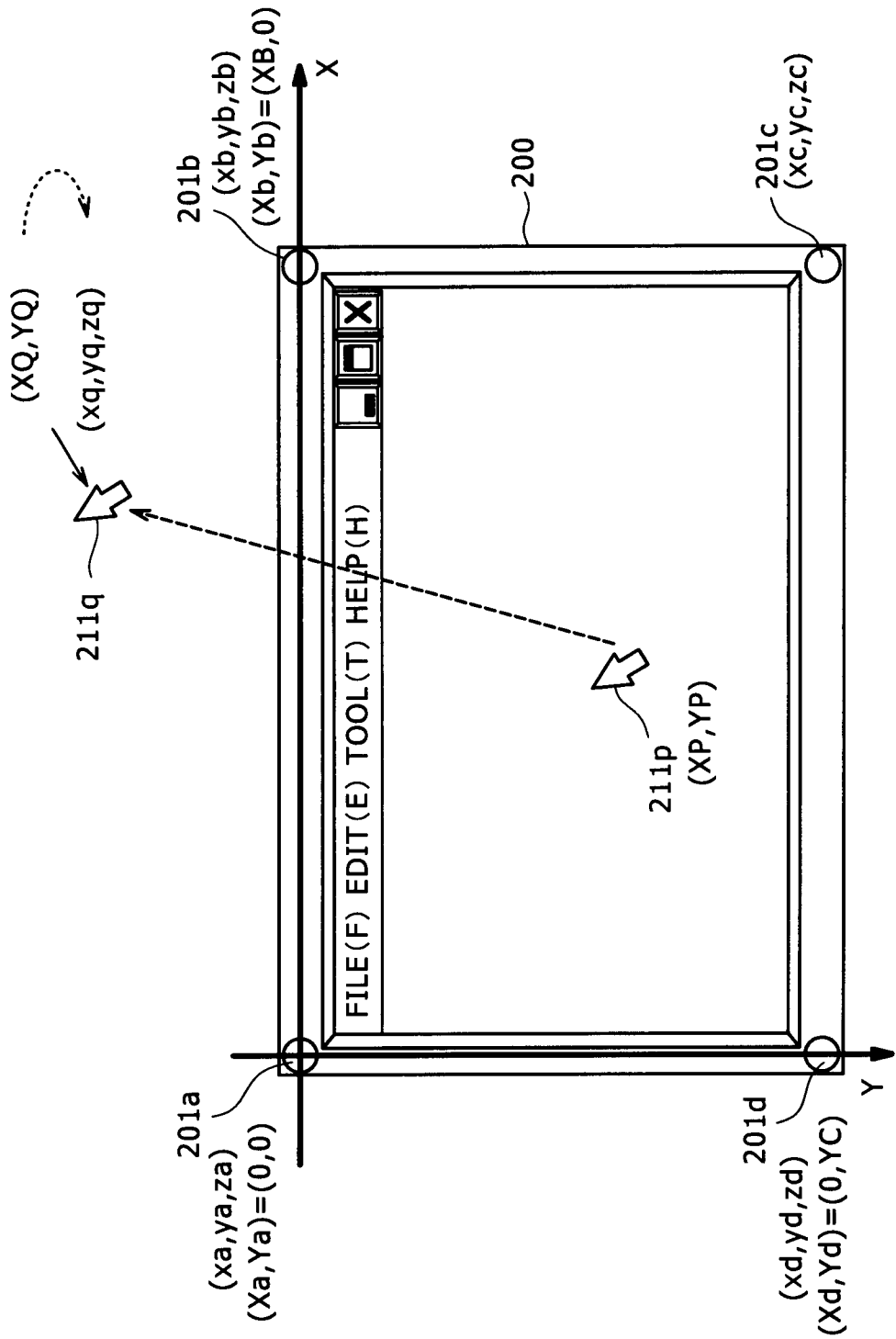
FIG. 7 is a diagram describing a specific example of a process illustrating an example of a process performed by the information processor according to the present invention.

A description will be given of this process with reference to FIG. 7. The three-dimensional information analysis section 131 has already acquired three-dimensional position information of markers 201a to 201d at the four corners of a display section 200 of the PC included in the camera-captured image. As illustrated in FIG. 7, the following pieces of position information have been acquired:

Marker 201a=(xa, ya, za)
Marker 201b=(xb, yb, zb)
Marker 201c=(xc, yc, zc)
Marker 201d=(xd, yd, zd)

It should be noted that these pieces of position information are in the camera coordinate system (x, y, z).

On the other hand, the mouse cursor position information (XQ, YQ) received from the PC 120 is in the PC display section plane coordinate system. As illustrated in FIG. 7, the mouse cursor position information is that having, for example, the top left corner of the display section as its origin (X, Y)=(0, 0) with the horizontal direction denoted by X and the vertical direction denoted by Y.

The virtual object management display module 132 calculates a plane of the display section in the camera coordinate system based on three-dimensional position information of the markers 201a to 201d, determining the position where the non-display data (mouse cursor drawing data), acquired from the PC 120, is to be placed on the calculated plane. In order to perform this process, the position information (XQ, YQ) represented in the display section plane coordinate system (X, Y) acquired from the PC 120 is converted, thus calculating the display position (xq, yq, zq) of a mouse cursor 211q in the camera coordinate system (x, y, z).

The display position (xq, yq, zq) of the mouse cursor 211q is set on the plane of the display surface formed by the markers 201a to 201d at the four corners of the display section 200 shown in FIG. 7. First, the display surface formed by the markers 201a to 201d at the four corners of the display section 200 is found.

This display surface can be defined by using arbitrary three of the four coordinates of the markers 201a to 201d at the four corners of the display section 200. For example, the display surface can be defined by using the coordinates of the following three points:

Marker 201a=(xa, ya, za)
Marker 201b=(xb, yb, zb)
Marker 201c=(xc, yc, zc)

An xyz plane (plane in the camera coordinate system (x, y, z) passing through the display surface can be expressed as illustrated in the Equation 1 shown below by using the coordinates of the above three points.

$$(x-xa)(yb-ya)(zc-za)+(xb-xa)(yc-ya)(z-za)+(xc-xa)(y-ya)(zb-za)-(xc-xa)(yb-ya)(z-za)-(xb-xa)(y-ya)(zc-za)-(x-xa)(yc-ya)(zb-za)=0 \quad \text{(Equation 1)}$$

The virtual object management display module 132 converts the position information (XQ, YQ) represented in the display section plane coordinate system (X, Y) acquired from the PC 120 into position coordinates (xq, yq, zq) on the xyz plane in the camera coordinate system (x, y, z).

We assume that the coordinates to be found are a coordinate position (xq, yq, zq) in the camera coordinate system (x, y, z) of the mouse cursor 211$q$ shown in FIG. 7.

Marker 201$a$=(xa, ya, za)
Marker 201$b$=(xb, yb, zb)
Marker 201$c$=(xc, yc, zc)

Further, the positions of the above three points in the display section plane coordinate system (X, Y) are respectively assumed to be as follows:

Marker 201$a$=(0, 0)
Marker 201$b$=(XB, 0)
Marker 201$c$=(0, YC)

The positional relationship between the following sets of coordinates in the display section plane coordinate system (X, Y), namely, Marker 201$a$=(0, 0)
Marker 201$b$=(XB, 0)
Marker 201$c$=(0, YC)
Position of a mouse cursor 211$p$ (XP, YP)
Position of the mouse cursor 211$q$ (XQ, YQ) is the same as that between the following sets of coordinates in the camera coordinate system (x, y, z), namely, Marker 201$a$=(xa, ya, za)
Marker 201$b$=(xb, yb, zb)
Marker 201$c$=(xc, yc, zc)
Position of the mouse cursor 211$p$ (xp, yp, zp)
Position of the mouse cursor 211$q$ (xq, yq, zq).

Hence, the following equations hold:

$$(0-XQ)/(0-XB)=(xa-xq)/(xa-xb)$$

$$(0-YQ)/(0-YC)=(ya-yq)/(ya-yc)$$

From the above, the following relational equations (Equations 2 and 3) can be derived:

$$xq=xa-XQ(xa-xb)/XB \quad \text{(Equation 2)}$$

$$yq=ya-YQ(ya-yb)/YC \quad \text{(Equation 3)}$$

By substituting the above relational equations (Equations 2 and 3) into the equation (Equation 1) described earlier, zq can be derived. The position (xq, yq, zq) of the mouse cursor 211$q$ is calculated as described above.

In step S108 shown in the flow of FIG. 6, the virtual object management module 132 converts the position information (XQ, YQ) of the non-display data acquired from the memory 133 into the position (xq, yq, zq) in the camera coordinate system for the camera-captured image acquired from the three-dimensional information analysis section 131 as described above.

Next, in step S109, the virtual object management module 132 displays the mouse cursor at the generated coordinate position (xq, yq, zq) in the camera coordinate system. It should be noted that if mouse cursor drawing data has been received from the PC 120 and is stored in the memory 133, the non-display data included in the data stored in the memory 133, i.e., the non-display data (mouse cursor drawing data) transferred from the PC 120, is displayed at the generated coordinate position (xq, yq, zq) in the camera coordinate system.

As a result of this process, the display data 150 shown in FIG. 5 appears on the display of the goggles 141 worn by the user 100. The display data 150 shown in FIG. 5 is a composite image showing the PC image 151 as a real object together with the mouse cursor 152$b$ as a virtual object. The virtual object management module 132 sets the display position of the virtual object in the space outside the PC display section as illustrated in FIG. 5. This display process allows for the user to move the mouse cursor outside of the PC display section rather than only inside the PC display section, thus making it possible to use a larger work area for data processing.

It should be noted that the process described with reference to the flowchart shown in FIG. 6 is performed each time the mouse cursor position changes as a result of the user operating the mouse 129 of the PC 120. The mouse coordinate processing module 122 transmits updated data to the mixed reality (MR) generator 130 each time the mouse cursor position changes. The mixed reality (MR) generator 130 changes the display position of the virtual object (mouse cursor) based on the updated data as a realtime process.

[3. Configuration of and Processes Performed by the Information Processor According to a Second Embodiment of the Present Invention]

A detailed description will be given next of the configuration of and processes performed by the information processor adapted to perform the process described earlier as a second embodiment of the present invention with reference to FIG. 2. As described with reference to FIG. 2, embodiment 2 is a configuration example in which the object 21 is moved to a space outside the display section 10 as illustrated in FIG. 2($b$) by specifying the object 21 and moving the mouse cursor 11$a$ along the movement line 22 shown in FIGS. 2($a$) and 2($b$) as a result of mouse operation by the user.

The present embodiment is performed by the devices configured as shown in FIG. 4 as with the first embodiment. In the example shown in FIG. 4, the user 100 is operating the PC (personal computer) 120, and the camera 142 is capturing an image of the PC (personal computer) 120 operated by the user 100. Therefore, the display of the goggles 141 worn by the user 100 displays, as a real-world image, an image including, for example, the display (display section 128) of the PC (personal computer) 120 operated by the user 100 and a variety of real objects around the display of the PC 120. Further, a virtual object, generated by the mixed reality (MR) generator 130, appears superimposed on the real-world image. The orientation of the camera 142 is changed according to the movement of the user 100.

If the user 100 faces the screen of the PC 120 while performing his or her tasks, the camera 142 captures an image centering around the image on the screen of the PC 120. As a result, display data 250 as illustrated, for example, in FIG. 8 appears on the display of the goggles 141 worn by the user 100. The display data 250 illustrated in FIG. 8 is a composite image including real and virtual objects.

A PC image 251 included in the display data 250 is a real image (real object) captured by the camera 142. For example, FIG. 8 shows the process in which the user moves the mouse 129 of the PC 120 shown in FIG. 4. If an object 252$a$ appearing in the PC image 251 shown in FIG. 8 is moved outside of the PC image 251 after having been specified by a mouse cursor 271$a$, an object 252 and mouse cursor 271 move together. If the object 252 and mouse cursor 271 continue to move, an object 252$b$ and mouse cursor 271$b$ are displayed outside the PC image 251 as virtual objects.

Figure 8:
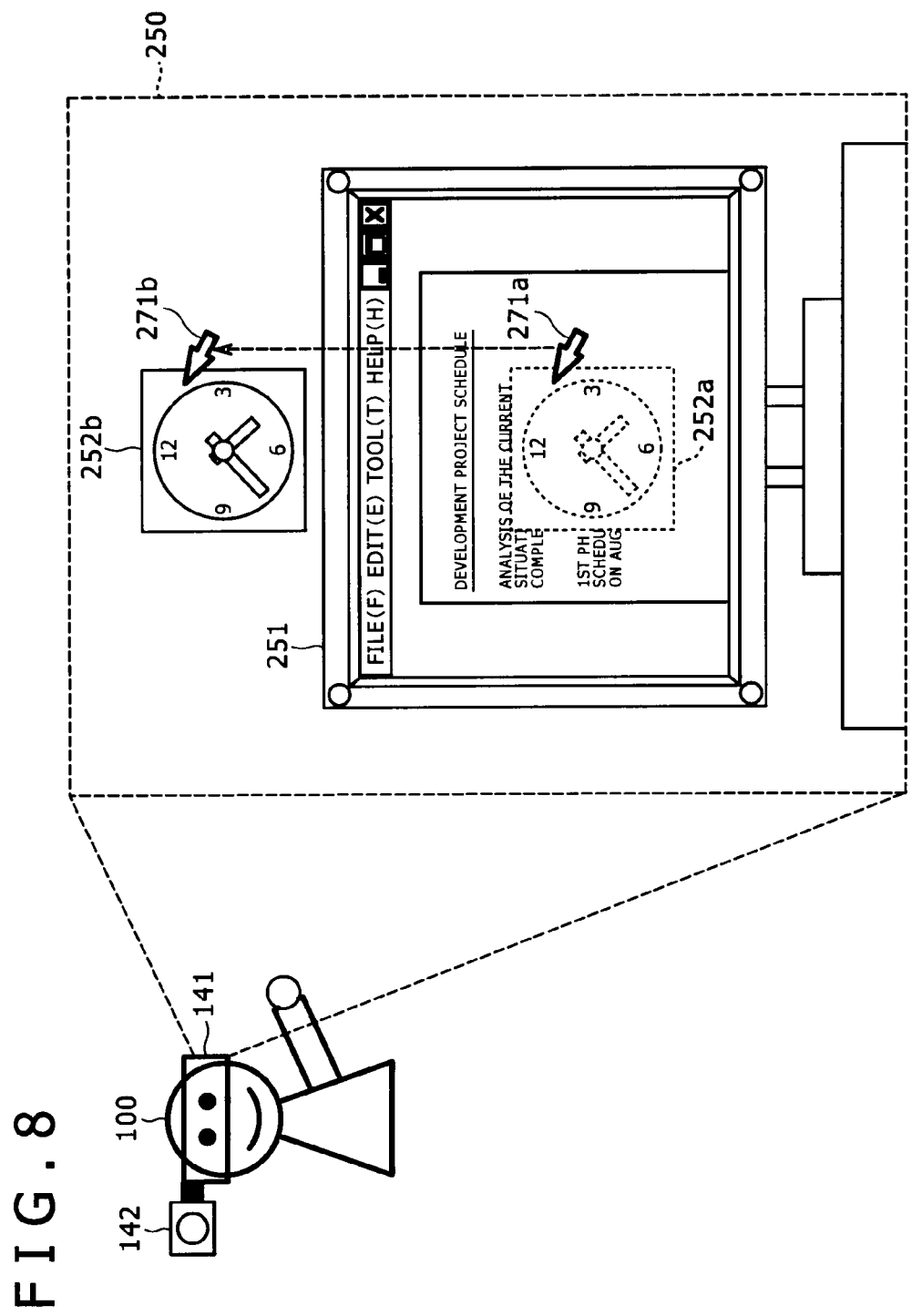
FIG. 8 is a diagram describing an example of display data displayed on the display of the goggles worn by the user as a result of a process performed by the information processor according to the present invention.

The user 100 shown in FIG. 4 can observe a composite image including, for example, the real and virtual objects shown in FIG. 8 on the display of the goggles 141. The PC image 251 shown in FIG. 8 is a real object captured by the camera 142. Both the object 252$a$ in the PC image 251 and the mouse cursor 271$a$ are information and real objects actually displayed in the PC image 151. On the other hand, the object 252*b* and mouse cursor 271*b* outside the PC image 251 shown in FIG. 8 are not real-world objects (real objects). The object 252*b* and mouse cursor 271*b* are virtual objects generated by the mixed reality (MR) generator 130. The object 252*b* and mouse cursor 271*b* are objects that do not exist in a real world but appear on the display of the goggles 141 worn by the user.

A description will be given below of the process sequence adapted to display virtual objects as described above with reference to the flowchart shown in FIG. 9. It should be noted that we assume that the user is operating the mouse 129 connected to the PC 120 shown in FIG. 4.

It should be noted that, as can be understood from the display data 250 shown in FIG. 8, the mouse cursor 271*b* is displayed as a virtual object in the present embodiment as in the first embodiment. The sequence adapted to display the mouse cursor 271*b* is performed in the same manner as the sequence described with reference to FIG. 6.

In the present embodiment 2, the process adapted to display the object 252 specified by the mouse is further added. The flowchart shown in FIG. 9 is a flow that describes only the sequence adapted to display this mouse-specified object. That is, if the display data 250 shown in FIG. 8 is generated and displayed, two processes, one according to the flow shown in FIG. 6 and another according to the flow shown in FIG. 9, are performed together.

Figure 9:
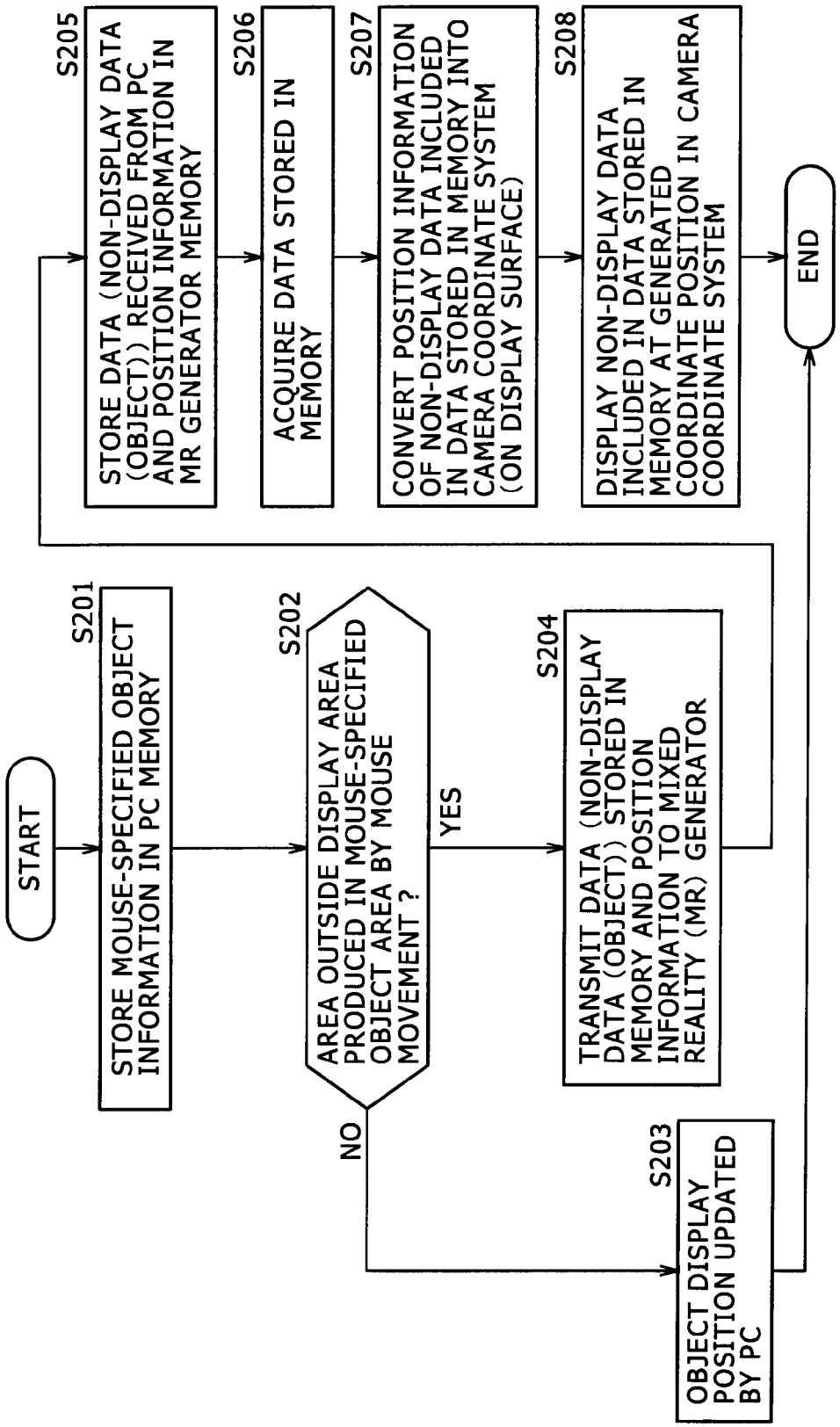
FIG. 9 is a diagram illustrating a flowchart that describes a process sequence performed by the information processor according to the present invention.

The process steps from step S201 to step S204 in the flowchart shown in FIG. 9 are performed by the PC 120 shown in FIG. 4.

The process steps from step S205 to step S208 are performed by the mixed reality (MR) generator 130 shown in FIG. 4.

In step S201, object information specified by the mouse 129 of the PC 120 is stored in the memory 127 of the PC 120. It should be noted that object information stored in the memory 127 includes drawing data and position information of the object. Position information is, for example, the coordinates of the center position serving as a reference of the object or a plurality of pieces of position information defining the outline.

Figure 10:
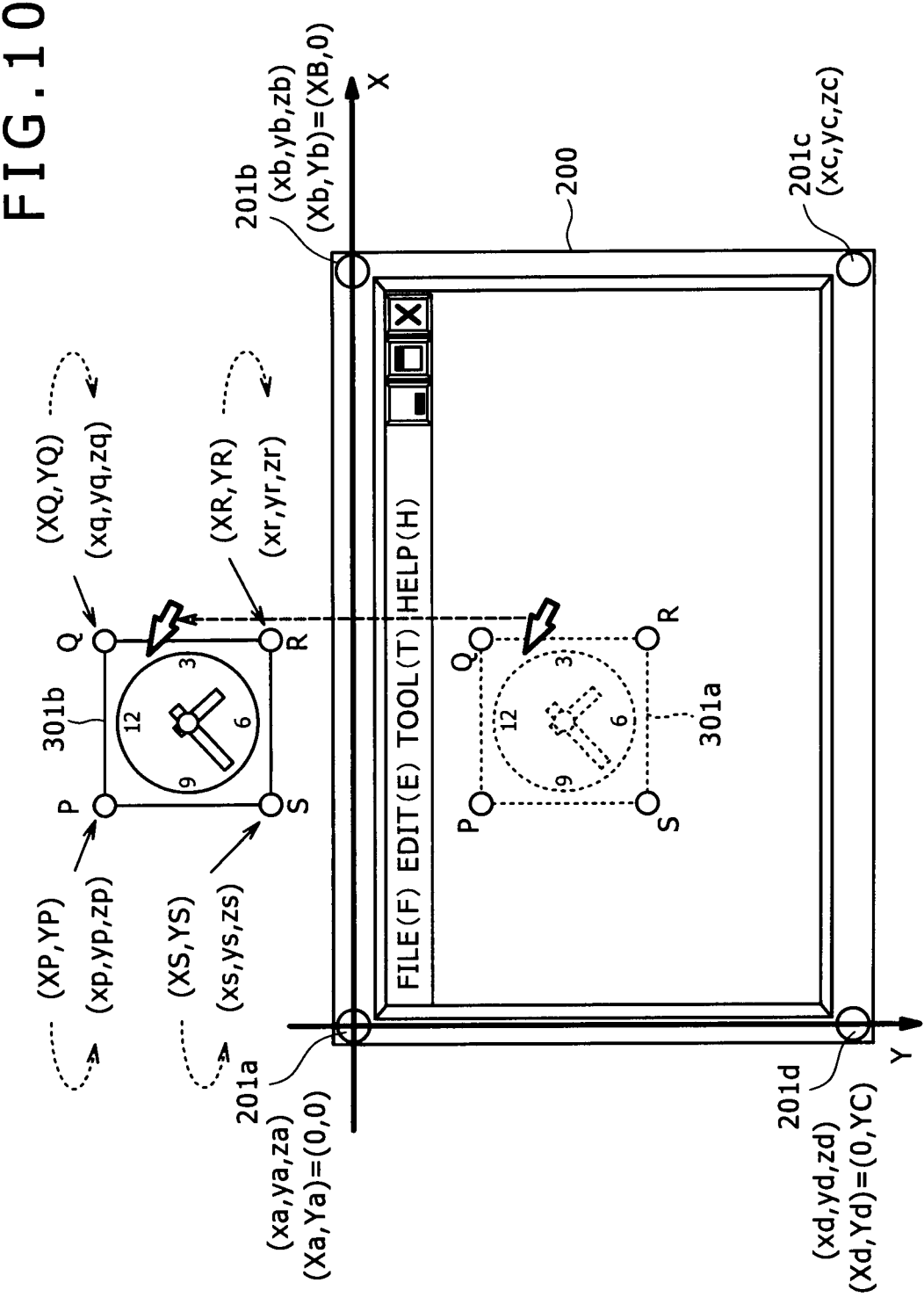
FIG. 10 is a diagram describing a specific example of a process illustrating an example of a process performed by the information processor according to the present invention.

In the case of rectangular data such as an object 301*a* shown in FIG. 10, for example, coordinate information of each of four apexes P, Q, R and S is stored in the memory as elements making up object information. It should be noted that position information need only be that which allows an object to be drawn at a specific position. Therefore, coordinate information of only one point, i.e., P, of all the four apexes P, Q, R and S, may be stored in the memory. Object drawing data representing the shape of the object is also stored in the memory. Therefore, even if coordinate information of only one point, i.e., P, is stored in the memory as position information, it is possible to draw (display) the object using P as a starting point.

In step S202, it is determined whether or not an out-of-display-section area has been produced in the mouse-specified object area as a result of the movement of the mouse 129 of the PC 120 by user operation. In this process, the application execution section 125 of the PC 120 makes this determination based on the new mouse cursor position and object shape acquired from the mouse coordinate processing module 122.

If the determination in step S202 is No, that is, if no out-of-display-section area has been produced in the mouse-specified object area, the process proceeds to step S203 where the application execution section 125 of the PC 120 displays the mouse-specified object in the display section.

Figure 11:
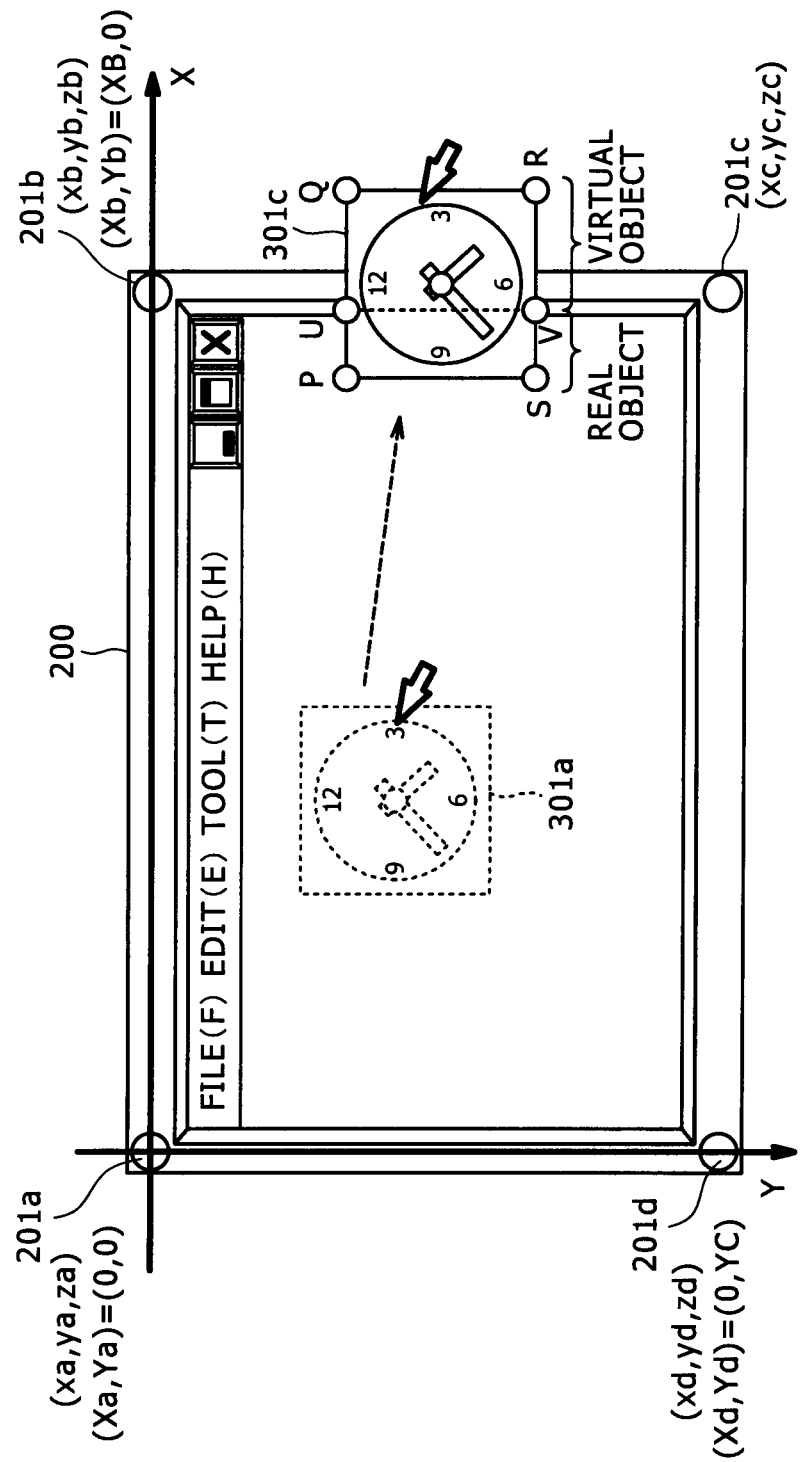
FIG. 11 is a diagram describing a specific example of a process illustrating an example of a process performed by the information processor according to the present invention.

On the other hand, when the determination in step S202 is Yes, that is, when an out-of-display-section area has been produced in the mouse-specified object area, the process proceeds to step S204. In this case, for example, the object is moved to the position of an object 301*b* shown in FIG. 10 or to the position of an object 301*c* shown in FIG. 11 by user operation. It should be noted that FIGS. 10 and 11 illustrate examples in which the objects 301*b* and 301*c* shown in FIGS. 10 and 11 appear at least partly as virtual objects on the display of the goggles worn by the user.

In step S204, the data (non-display data (object drawing data)) and position information stored in the memory are transmitted to the mixed reality (MR) generator 130. In the example shown in FIG. 10, for example, the drawing data of the clock, i.e., the object 301*b*, and the coordinate data of each of the four apexes P, Q, R and S of the object 301*b*, are acquired from the memory 127 of the PC 120 and transmitted to the mixed reality (MR) generator 130.

It should be noted that the transferred position information is that in the PC display section plane coordinate system as with embodiment 1 which is position information having, for example, the top left corner of the display section as its origin $(X, Y)=(0, 0)$ with the horizontal direction denoted by X and the vertical direction denoted by Y as illustrated in FIG. 10. In the example shown in FIG. 10, coordinate information of the following four apexes is transferred:

$P=(XP, YP)$
$Q=(XQ, YQ)$
$R=(XR, YR)$
$S=(XS, YS)$

The process steps from step S205 onward are performed by the mixed reality (MR) generator 130.

First, in step S205, the mixed reality (MR) generator 130 stores the data received from the PC 120, i.e., the non-display data (object drawing data) and position information (P, Q, R and S coordinate information), in the memory 133 of the mixed reality (MR) generator 130.

Next, in step S206, the virtual object management module 132 of the mixed reality (MR) generator 130 acquires the data stored in the memory 133, i.e., the non-display data (object drawing data) and position information (P, Q, R and S coordinate information).

Next, in step S207, the virtual object management module 132 converts the position information of points P, Q, R and S acquired from the memory 133 into positions in the camera coordinate system for the camera-captured image acquired from the three-dimensional information analysis section 131.

This coordinate conversion is performed in the same manner as the coordinate conversion of the mouse cursor described in the first embodiment. Therefore, the detailed description thereof is omitted.

In the example shown in FIG. 10, for example, the coordinates of each of points P, Q, R and S of the object 301*b* in the display section plane coordinate system (X, Y) are converted into the following coordinates in the camera coordinate system (x, y, z):

$P=(XP, YP) \rightarrow (xp, yp, zp)$
$Q=(XQ, YQ) \rightarrow (xq, yq, zq)$
$R=(XR, YR) \rightarrow (xr, yr, zr)$
$S=(XS, YS) \rightarrow (xs, ys, zs)$ As described above, the virtual object management module 132 converts, in step S270 shown in the flow of FIG. 9, the position information of the non-display data acquired from the memory 133, into positions (xq, yq, zq) in the camera coordinate system for the camera-captured image acquired from the three-dimensional information analysis section 131.

Next, in step S208, the virtual object management module 132 acquires the non-display data (object drawing data) contained in the data stored in the memory 133, drawing or displaying the objects at the generated coordinate positions in the camera coordinate system as illustrated in FIG. 10.

As a result of this process, the display data 250 shown in FIG. 8 appears on the display of the goggles 141 worn by the user 100. The display data 250 shown in FIG. 8 is a composite image showing the PC image 251 as a real object together with the object 252b and mouse cursor 271b as virtual objects. The virtual object management module 132 sets the display positions of the virtual objects in the space outside the PC display section as illustrated in FIG. 8. This display process allows for the user to display a variety of objects in a space outside the PC display section rather than only inside the PC display section, thus making it possible to use a larger work area for data processing.

It should be noted that the process described with reference to the flowchart shown in FIG. 9 is performed each time the mouse cursor position changes as a result of the user operating the mouse 129 of the PC 120. The application execution section 125 transmits updated data to the mixed reality (MR) generator 130 each time the mouse cursor position changes. The mixed reality (MR) generator 130 changes the display position of the virtual object (clock) based on the updated data as a realtime process.

It should be noted that the case in which the determination in step S202 is Yes in the flowchart shown in FIG. 9 also occurs, for example, at the position of the object 301c shown in FIG. 11. That is, the determination in step S202 is Yes if even only part of the mouse-specified object is located outside the display area of the PC display section.

In this case, the position information of points P, Q, R and S shown in FIG. 11 is also transferred from the PC 120 to the mixed reality (MR) generator 130 as the position information of the object 301c. The mixed reality (MR) generator 130 need only display the object 301c in such a manner that part of the object 301c appears superimposed on the display section of the PC.

It should be noted that, in this case, only an out-of-display-section area of the object 301c shown in FIG. 11 enclosed by points U, Q, R and V may appear as a virtual object and that, as for the portion of the object enclosed by points P, U, V and S, not a virtual object but the real object appearing on the display section of the PC, i.e., the camera-captured image itself, may be displayed on the display of the goggles worn by the user.

In order to perform this process, the virtual object management module 132 of the mixed reality (MR) generator 130 generates virtual object display data, made up only of the data of the portion enclosed by points U, Q, R and V as shown in FIG. 11, and displays this display data during the virtual object display process. That is, the data of the portion enclosed by points P, U, V and S of the object drawing data received from the PC is made to appear transparent.

[4. Configuration of and Processes Performed by the Information Processor According to a Third Embodiment of the Present Invention]

A detailed description will be given next of the configuration of and processes performed by the information processor adapted to perform the process described earlier as a third embodiment of the present invention with reference to FIG. 3. As described with reference to FIG. 3, embodiment 3 is a configuration example in which the object information 31c is displayed as illustrated in FIG. 3(b) by specifying an object 31 in a real space outside the PC display section as a result of mouse operation by the user.

Figure 12:
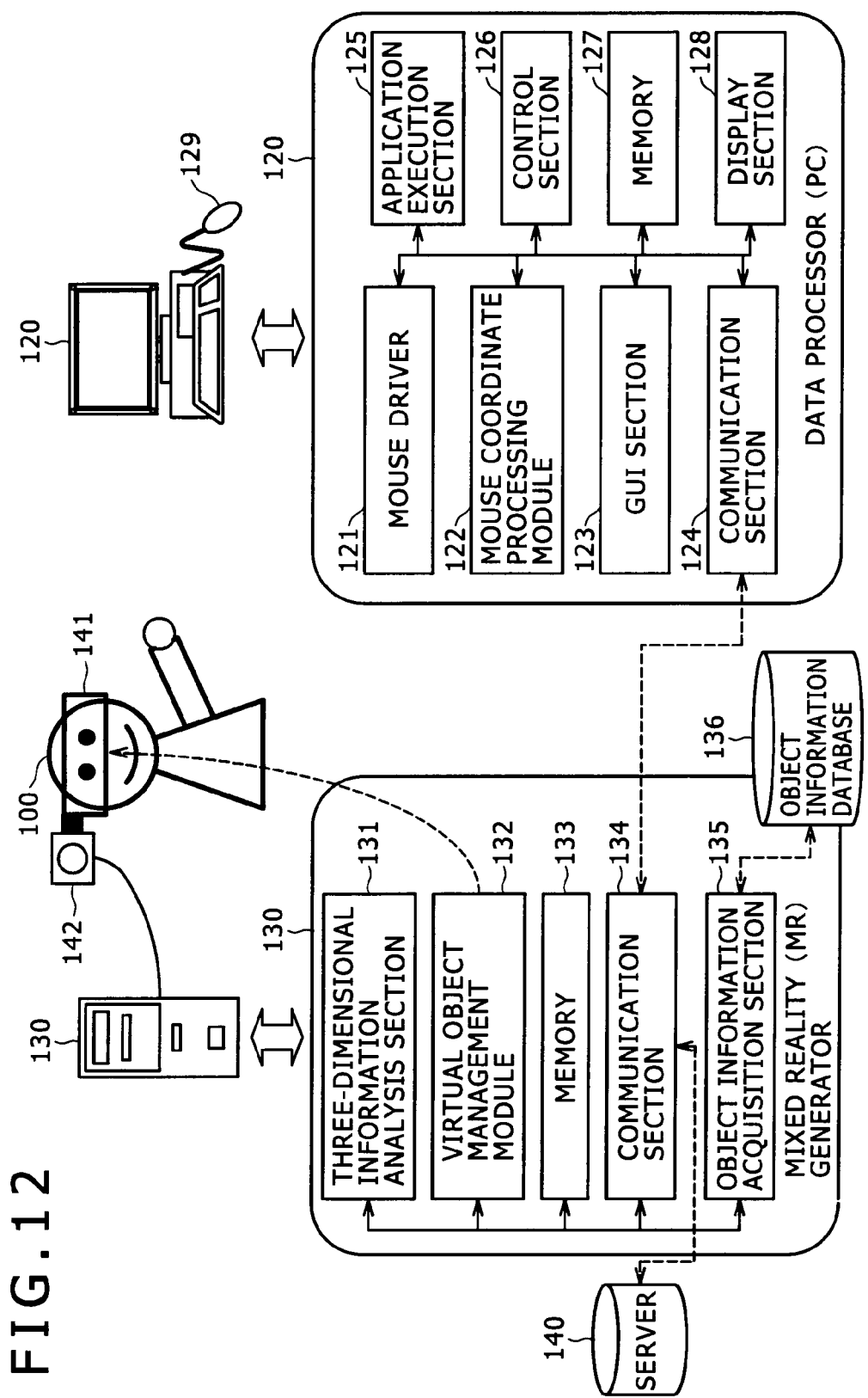
FIG. 12 is a diagram describing a configuration example of the information processor according to the present invention.

The present embodiment is performed by the devices configured as shown in FIG. 12. The PC 120 is configured in the same manner as described earlier with reference to FIG. 4 in embodiment 1. The mixed reality (MR) generator 130 includes the three-dimensional information analysis section 131, virtual object management module 132, memory 133, communication section 134, an object information acquisition section 135 and object information database 136. It should be noted that the object information database 136 need not essentially be provided in the mixed reality (MR) generator 130. The object information database 136 need only be, for example, a network-connectable database that can be accessed via the communication section of the mixed reality (MR) generator 130.

The three-dimensional information analysis section 131, virtual object management module 132, memory 133 and communication section 134 are configured in the same manner as described earlier with reference to FIG. 4 in the first embodiment. It should be noted, however, that the communication section 134 communicates with an external server 140 or the object information database 136 via a network.

The object information acquisition section 135 acquires a variety of real object images from the image captured by the camera 142 worn by the user 100 and compares the images with the data stored in the object information database 136, selecting similar images and acquiring object information associated with the selected images.

For example, if the real object image is a photograph of a CD jacket, the object information is a variety of information such as song title and genre of the CD, artist and price. These pieces of object information are associated with the object image and stored in the object information database 136.

It should be noted that the server 140 also holds the same information as that stored in the object information database 136. The mixed reality (MR) generator 130 transmits the image captured by the camera 142 worn by the user 100 or a real object image (e.g., CD jacket image) selected from the captured image to the server via the communication section 134. The server extracts corresponding object information from the received image, supplying the object information to the mixed reality (MR) generator 130.

As described above, the mixed reality (MR) generator 130 acquires object information from the object information database 136 or server 140 and supplies the acquired information to the PC 120 together with the data of the real object image captured by the camera 142. The PC 120 displays the acquired information on its display section using the acquired information.

Figure 13:
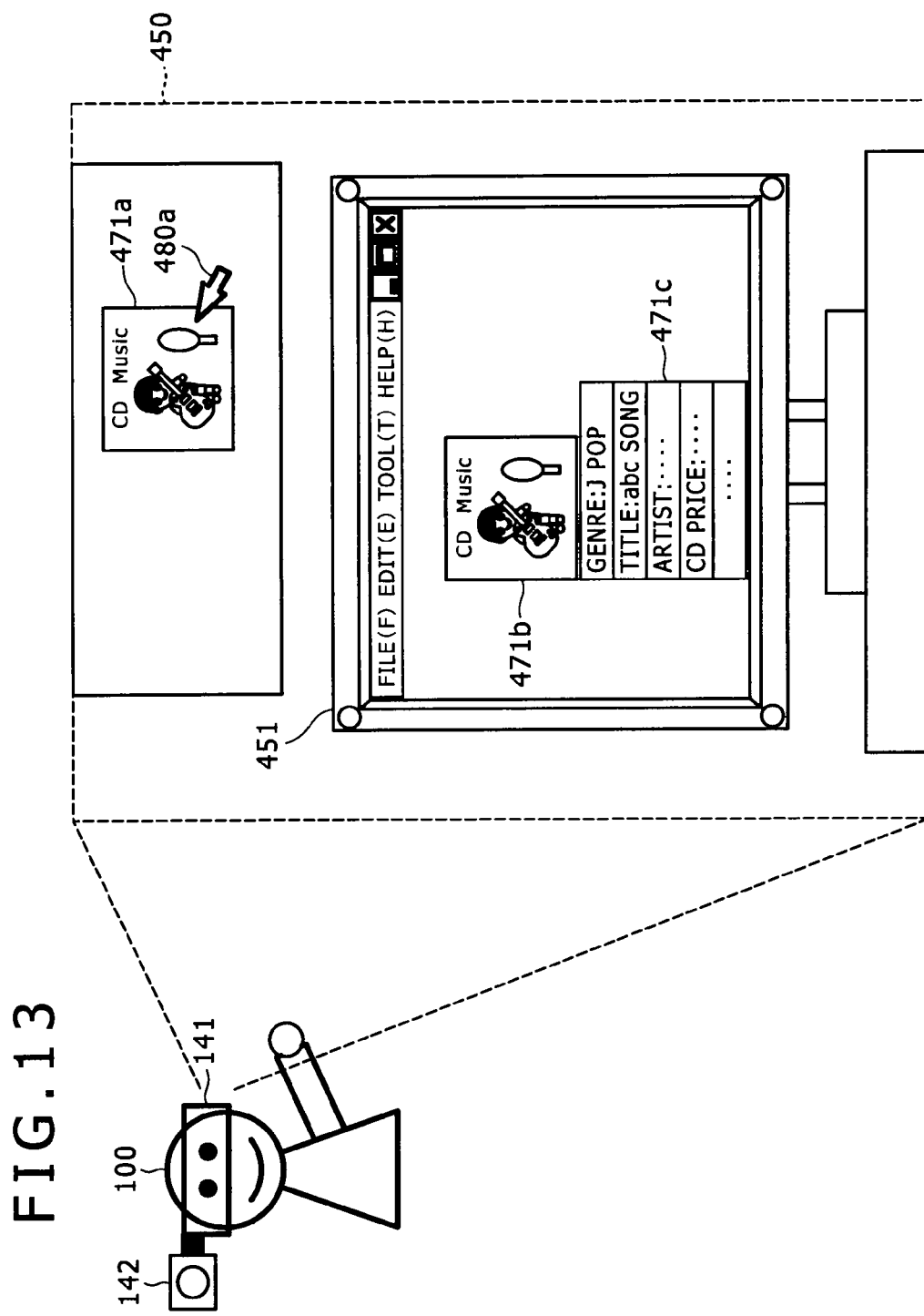
FIG. 13 is a diagram describing an example of display data displayed on the display of the goggles worn by the user as a result of a process performed by the information processor according to the present invention.

As a result, display data 450 as shown, for example, in FIG. 13 appears on the display of the goggles 14 worn by the user 100. A PC image 451 included in the display data 450 is a real image (real object) captured by the camera 142. An object 471a outside the PC image 451 is also a real object. A mouse cursor 480a is a virtual object.

An object image 471b and object information 471c appearing in the PC image 451 are data displayed on the display section 128 by the application execution section 125 of the PC 120. Of the display data 450 shown in FIG. 13, therefore, the information other than the mouse cursor 480a is the image appearing on the display of the goggles 141 worn by the user 100. This image can also be observed by those users not wearing any goggles.

That is, the object image 471b and object information 471c appearing in the PC image 451 are display data on the display section of the PC 120 which can be observed by anybody.

A description will be given below of the process sequence adapted to process data as described above with reference to the flowchart shown in FIG. 14. It should be noted that we assume that the user is operating the mouse 129 connected to the PC 120 shown in FIG. 12.

It should be noted that, as can be understood from the display data 450 shown in FIG. 13, the mouse cursor 480a is displayed as a virtual object in the present embodiment as in the first and second embodiments. The sequence adapted to display the mouse cursor 480a is performed in the same manner as the sequence described with reference to FIG. 6.

In the present embodiment 3, the process for the real object specified by the mouse is further added. The flowchart shown in FIG. 14 is a flow that describes only the sequence for this mouse-specified object. That is, if the display data 450 shown in FIG. 13 is generated and displayed, two processes, one according to the flow shown in FIG. 6 and another according to the flow shown in FIG. 14, are performed together.

The process step in step S301 in the flowchart shown in FIG. 14 is performed by both the PC 120 and mixed reality (MR) generator 130 shown in FIG. 12. The process steps from step S302 to step S309 are performed by the mixed reality (MR) generator 130 shown in FIG. 12. The process step in step S310 is performed by the PC 120 shown in FIG. 12.

Prior to the process step in step S301, the process according to the flow shown in FIG. 6 described in the first embodiment is performed, thus placing the mouse cursor in an out-of-display-section area. We assume, for example, that the mouse cursor is located at the position of the mouse cursor 480a shown in FIG. 13.

In step S301, it is determined whether or not a real object has been specified by mouse operation. When a real object has been specified, the process proceeds to step S302. If a real object has not been specified, the process is terminated. The following process is performed when a real object has been specified. First, when mouse clicking information is supplied to the application execution section 125 via the mouse driver 121 of the PC 120, the application execution section 125 notifies the mouse operation (clicking) information to the mixed reality (MR) generator 130 via the communication section 124. The mixed reality (MR) generator 130 receives the mouse operation information via the communication section 134 and notifies the same information to the virtual object management module 132.

In step S302, the virtual object management module 132 determines whether or not an out-of-PC-display-section area is included in the object area of the specified real object and located in the imaging range of the camera. The camera is the camera 142 worn by the user 100. If the determination in step S302 is No, the process is terminated. When the determination in step S302 is Yes, the process proceeds to step S303.

In step S303, an image including the mouse-specified object is captured by the camera 142 worn by the user 100, and the captured image stored in the memory. This process is performed under control of the virtual object management module 132.

The process steps from step S304 to S306 are designed to acquire object information from the object information database 136. Those from step S307 to S308 are designed to acquire object information from the server 140. Either of these processes may be performed. Alternatively, both thereof may be performed.

A description will be given first of the process steps from step S304 to S306 adapted to acquire object information from the object information database 136.

In step S304, the object information database (DB) 136 is searched using the mouse-specified object image stored in the memory as a search key. This process is performed by the object information acquisition section 135.

Image data of a variety of real objects and objet information of the objects for the image data are registered in the object information database (DB) 136. Among such object information are photographs of CD jackets and song titles and prices of the CDs.

In step S305, the object information acquisition section 135 searches the object information database (DB) 136. That is, the same section 135 determines whether or not any image data registered in the object information database (DB) 136 matches or is similar to the mouse-specified object image. The process is terminated if no matching or similar registered image is extracted. The process proceeds to step S306 when matching or similar registered image is extracted.

In step S306, the object information acquisition section 135 acquires, from the object information database (DB) 136, the registered data for the registered image matching or similar to the mouse-specified object image, i.e., the object image and object information.

A description will be given next of the process steps from step S307 to step S308 using the server 140. In step S307, the object information acquisition section 135 transmits the mouse-specified object image stored in the memory to the server 140 via the communication section 134.

In step S308, the object information acquisition section 135 acquires, from the server 140, the object image and object information selected based on the information registered in the server. The server 140 performs the same process as the object information acquisition section 135, searching database of the server 140 using the mouse-specified object image as a search key and extracting the object information. It should be noted that an error message is notified if the object information cannot be extracted.

In step S309, the mixed reality (MR) generator 130 transmits, to the PC 120, the object information and object image data acquired from the server or database. It should be noted that the object image data may be that acquired from the server or database or the image captured by the camera 142.

The process step in the final step S310 is performed by the PC 120. In step S310, the data acquired from the mixed reality (MR) generator 130 is displayed on the PC display section thanks to the process performed by the application in the PC.

As a result, the display data 450 shown in FIG. 13 appears on the display of the goggles 14 worn by the user 100. As described earlier, the object image 471b and object information 471c appearing in the PC image 451 are the data displayed on the display section 128 by the application execution section 125 of the PC 120. Therefore, the display data 450 other than the mouse cursor 480a shown in FIG. 13 is information that can also be observed by those users not wearing any goggles.

The present invention has been described above in detail with reference to the particular embodiments. However, it is obvious that those skilled in the art can modify or substitute the embodiments without departing from the gist of the present invention. That is, the present invention has been disclosed by way of illustration and should not be interpreted in a limited manner. The appended claims should be taken into consideration for evaluation of the gist of the present invention.

On the other hand, the series of processes described in the specification may be performed by hardware or software or by a combination of both. If the series of processes are performed by software, the program containing the process sequence is installed into the memory of a computer incorporated in dedicated hardware for execution or into a general-purpose personal computer capable of performing various processes for execution. For example, the program can be stored on a recording media in advance. In addition to installation from a recording media into a computer, the program can be installed to a recording media such as built-in harddisk by receiving the program via a network such as a LAN (Local Area Network) or the Internet.

It should be noted that each of the processes described in the specification may be performed not only chronologically according to the description but also in parallel or individually according to the processing capability of the device performing the process or as necessary. On the other hand, the term "system" in the present specification refers to a logical collection of a plurality of devices, and that the constituent devices are not necessarily provided in the same enclosure.

INDUSTRIAL APPLICABILITY

As described above, in the configuration according to the embodiment of the present invention, a cursor or object lying in an area outside the area of the display section of a PC or other device is displayed as a virtual object. For example, the display of goggles worn by the user displays a display device such as a PC and the area outside the display device. The three-dimensional position of the cursor or object that has probably moved in response to user operation is calculated, after which the cursor or object is displayed as a virtual object at the calculated position. Further, object information for the object specified by the cursor is acquired and presented. The present configuration makes it possible to constantly observe and verify data that has moved outside the display section, thus providing improved data processing efficiency.

DESCRIPTION OF THE REFERENCE SYMBOLS

10 Display section
11 Mouse cursor
12 Movement line
21 Object
22 Movement line
31a, 31b Objects
31c Object information
100 User
120 PC (personal computer)
121 Mouse driver
122 Mouse coordinate processing module
123 GUI section
124 Communication section
125 Application execution section
126 Control section
127 Memory
128 Display section
129 Mouse
130 Mixed reality (MR) generator
131 Three-dimensional information analysis section
132 Virtual object management module
133 Memory
134 Communication section
135 Object information acquisition section
136 Object information database
140 Server
141 Goggles
142 Camera
150 Display data
151 PC image
152 Mouse cursor
200 Display section
201 Markers
211 Mouse cursor
250 Display data
251 PC image
252 Object
271 Mouse cursor
301 Object
450 Display data
451 PC image
471a, 471b Objects
471c Object information

The invention claimed is:

1. An information processor comprising:
   a coordinate processing module adapted to determine whether a position of a cursor displayed on a first display section, is located in or outside an area of the first display section and output cursor position information to a virtual object management section if the cursor is located outside the area of the first display section;
   a camera adapted to capture an image made up of a real object including the first display section;
   a three-dimensional information analysis section adapted to analyze a three-dimensional position of the real object included in the camera-captured image;
   a second display section adapted to display the camera-captured image;
   a virtual object management section adapted to generate a virtual object different from the real object included in the camera-captured image and generate a composite image including the generated virtual object and the real object so as to display the composite image on the second display section; and
   an application execution section adapted to process a specified object specified by the cursor,
   wherein the virtual object management section calculates a three-dimensional position of the cursor based on the cursor position information supplied from the coordinate processing module so as to display, on the second display section, the composite image in which a virtual cursor is placed at a first calculated position;
   wherein the application execution section determines whether the specified object is moved by the cursor to locate in or outside the area of the first display section and outputs object position information of the specified object to the virtual object management section if the specified object is moved to locate outside the area of the first display section; and
   wherein the virtual object management section calculates a three-dimensional position of the specified object based on the object position information of the specified object so as to display, on the second display section, a composite image in which a virtual specified object is placed at a second calculated position.

2. The information processor of claim 1,
   wherein if the three-dimensional position of the specified object includes the display area of the first display section, the virtual object management section displays, on the second display section, a composite image with an object area image overlapping the display area of the first display section.

3. The information processor of claim 1 further comprising:
   an object information acquisition section adapted to acquire image data of a real object specified by the cursor placed as the virtual object and search data based on the acquired image data so as to acquire object information,
   wherein the object information acquisition section outputs the acquired object information to the first display section as display data.

4. The information processor of claim 3, wherein
the object information acquisition section accesses a database or a server storing real object image data and object information associated with each other so as to acquire object information through a search based on the real object image data.

5. The information processor of claim 1, wherein
the virtual object management section calculates a plane including the display surface of the first display section based on three-dimensional position information of components making up the first display section included in the camera-captured image and calculates the three-dimensional position of the cursor so that the cursor position is placed on the plane.

6. The information processor of claim 1, wherein
the cursor is a mouse cursor that moves by mouse operation, and
the coordinate processing module receives mouse cursor displacement information resulting from the mouse operation and determines whether the mouse cursor is located in or outside the area of the first display section.

7. An information processing method performed by an information processor, the information processing method comprising:
determining, by the information processor, whether a position of a cursor displayed on a first display section, is located in or outside an area of the first display section and outputting cursor position information if the cursor is located outside the area of the first display section;
analyzing a three-dimensional position of a real object in a camera-captured image, the camera-captured image including the first display section;
generating a virtual object different from the real object included in the camera-captured image;
generating a composite image including the generated virtual object and the real object so as to display the composite image on a second display section;
calculating a three-dimensional position of the cursor based on the cursor position information so as to display, on the second display section, a composite image in which a virtual cursor is placed at a first calculated position;
determining whether a specified object specified by the cursor is moved by the cursor to locate in or outside the area of the first display section and outputting object position information of the specified object to the virtual object management section if the specified object is moved to locate outside the area of the first display section; and
calculating a three-dimensional position of the specified object based on the object position information of the specified object so as to display, on the second display section, a composite image in which a virtual specified object is placed at a second calculated position.

8. A non-transitory computer-readable medium storing a program which, when executed by an information processor, causes the information processor to:
determine whether a position of a cursor displayed on a first display section, is located in or outside an area of the first display section and output cursor position information to a virtual object management section if the cursor is located outside the area of the first display section;
analyze a three-dimensional position of the real object included in the camera-captured image, the camera-captured image including the first display section;
generate a virtual object different from the real object included in the camera-captured image and generate a composite image including the generated virtual object and the real object so as to display the composite image on the second display section;
calculate a three-dimensional position of the cursor based on the cursor position information supplied from the coordinate processing module so as to display, on the second display section, a composite image in which a virtual cursor is placed at the calculated position;
determine whether a specified object specified by the cursor is moved by the cursor to locate in or outside the area of the first display section and output object position information of the specified object to the virtual object management section if the specified object is moved to locate outside the area of the first display section; and
calculate a three-dimensional position of the specified object based on the object position information of the specified object so as to display, on the second display section, a composite image in which a virtual specified object is placed at a second calculated position.

* * * * *